US008783360B2

(12) United States Patent
Zediker et al.

(10) Patent No.: US 8,783,360 B2
(45) Date of Patent: Jul. 22, 2014

(54) LASER ASSISTED RISER DISCONNECT AND METHOD OF USE

(75) Inventors: Mark S. Zediker, Castle Rock, CO (US); Henry A. Bergeron, Houston, TX (US); Philip V. Clark, Sugar Land, TX (US); Brian O. Faircloth, Evergreen, CO (US); Joel F. Moxley, Denver, CO (US); Paul D. Deutch, Houston, TX (US); Charles C. Rinzler, Denver, CO (US)

(73) Assignees: Foro Energy, Inc., Houston, TX (US); Chevron U.S.A. Inc., Houston, TX (US)

( * ) Notice: Subject to any disclaimer, the term of this patent is extended or adjusted under 35 U.S.C. 154(b) by 603 days.

(21) Appl. No.: 13/034,017

(22) Filed: Feb. 24, 2011

(65) Prior Publication Data

US 2012/0217015 A1    Aug. 30, 2012

(51) Int. Cl.
| E21B 29/12 | (2006.01) |
| E21B 43/116 | (2006.01) |
| E21B 43/119 | (2006.01) |
| E21B 29/06 | (2006.01) |
| E21B 29/08 | (2006.01) |
| E21B 34/04 | (2006.01) |
| E21B 33/06 | (2006.01) |
| E21B 7/12 | (2006.01) |
| E21B 19/00 | (2006.01) |
| F16L 23/00 | (2006.01) |
| E21B 33/038 | (2006.01) |

(52) U.S. Cl.
CPC ........... *E21B 33/038* (2013.01); *E21B 33/06* (2013.01); *E21B 29/12* (2013.01); *E21B 7/12* (2013.01); *E21B 19/004* (2013.01); *F16L 23/003* (2013.01)

USPC .......... 166/361; 166/297; 166/298; 166/55; 166/55.6; 166/363

(58) Field of Classification Search
USPC .......... 166/361, 363, 364, 297, 298, 55, 55.6, 166/85.4; 137/315.02; 251/1.1, 1.2, 1.3; 219/121.67, 121.72
See application file for complete search history.

(56) References Cited

U.S. PATENT DOCUMENTS

| 914,636 A | 3/1909 | Case |
| 2,548,463 A | 4/1951 | Blood |

(Continued)

FOREIGN PATENT DOCUMENTS

| EP | 0 565 287 A1 | 10/1993 |
| EP | 0 950 170 B1 | 9/2002 |

(Continued)

OTHER PUBLICATIONS

U.S. Appl. No. 12/543,968, filed Aug. 19, 2009, Rinzler et al.

(Continued)

*Primary Examiner* — Matthew Buck
*Assistant Examiner* — Edwin Toledo-Duran
(74) *Attorney, Agent, or Firm* — Glen P. Belvis; Steptoe & Johnson LLP

(57) ABSTRACT

There is provided a high power laser-riser blowout preventer package and laser module for use with a subsea riser. The laser module and laser-riser package use high power laser energy to quickly cut the riser permitting an offshore drilling rig to quickly, and in a controlled manner disconnect from a blowout preventer.

70 Claims, 17 Drawing Sheets

(56) References Cited

U.S. PATENT DOCUMENTS

| | | | |
|---|---|---|---|
| 2,742,555 A | 4/1956 | Murray | |
| 3,122,212 A | 2/1964 | Karlovitz | |
| 3,168,334 A * | 2/1965 | Johnson | 285/55 |
| 3,461,964 A * | 8/1969 | Venghiattis | 166/297 |
| 3,493,060 A | 2/1970 | Van Dyk | |
| 3,539,221 A | 11/1970 | Gladstone | |
| 3,544,165 A | 12/1970 | Snedden | |
| 3,556,600 A | 1/1971 | Shoupp et al. | |
| 3,561,526 A | 2/1971 | Williams et al. | |
| 3,574,357 A | 4/1971 | Alexandru et al. | |
| 3,652,447 A | 3/1972 | Yant | |
| 3,693,718 A | 9/1972 | Stout | |
| 3,820,605 A | 6/1974 | Barber et al. | |
| 3,821,510 A | 6/1974 | Muncheryan | |
| 3,871,485 A | 3/1975 | Keenan, Jr. | |
| 3,882,945 A | 5/1975 | Keenan, Jr. | |
| 3,913,668 A * | 10/1975 | Todd et al. | 166/359 |
| 3,938,599 A | 2/1976 | Horn | |
| 3,960,448 A | 6/1976 | Schmidt et al. | |
| 3,977,478 A | 8/1976 | Shuck | |
| 3,981,369 A | 9/1976 | Bokenkamp | |
| 3,992,095 A | 11/1976 | Jacoby et al. | |
| 3,998,281 A | 12/1976 | Salisbury et al. | |
| 4,019,331 A | 4/1977 | Rom et al. | |
| 4,025,091 A | 5/1977 | Zeile, Jr. | |
| 4,026,356 A | 5/1977 | Shuck | |
| 4,043,575 A * | 8/1977 | Roth | 285/90 |
| 4,046,191 A * | 9/1977 | Neath | 166/352 |
| 4,061,190 A | 12/1977 | Bloomfield | |
| 4,066,138 A | 1/1978 | Salisbury et al. | |
| 4,081,027 A * | 3/1978 | Nguyen | 116/55 |
| 4,086,971 A * | 5/1978 | Hall et al. | 175/7 |
| 4,090,572 A | 5/1978 | Welch | |
| 4,113,036 A | 9/1978 | Stout | |
| 4,189,705 A | 2/1980 | Pitts, Jr. | |
| 4,194,536 A | 3/1980 | Stine et al. | |
| 4,199,034 A | 4/1980 | Salisbury et al. | |
| 4,227,582 A * | 10/1980 | Price | 175/16 |
| 4,228,856 A | 10/1980 | Reale | |
| 4,252,015 A | 2/1981 | Harbon et al. | |
| 4,256,146 A | 3/1981 | Genini et al. | |
| 4,266,609 A | 5/1981 | Rom et al. | |
| 4,280,535 A | 7/1981 | Willis | |
| 4,282,940 A | 8/1981 | Salisbury et al. | |
| 4,332,401 A | 6/1982 | Stephenson et al. | |
| 4,336,415 A | 6/1982 | Walling | |
| 4,340,245 A | 7/1982 | Stalder | |
| 4,370,886 A | 2/1983 | Smith, Jr. et al. | |
| 4,374,530 A | 2/1983 | Walling | |
| 4,375,164 A | 3/1983 | Dodge et al. | |
| 4,415,184 A | 11/1983 | Stephenson et al. | |
| 4,417,603 A | 11/1983 | Argy | |
| 4,444,420 A | 4/1984 | McStravick et al. | |
| 4,453,570 A | 6/1984 | Hutchison | |
| 4,459,731 A | 7/1984 | Hutchison | |
| 4,477,106 A | 10/1984 | Hutchison | |
| 4,531,552 A | 7/1985 | Kim | |
| 4,533,814 A * | 8/1985 | Ward | 219/121.64 |
| 4,565,351 A | 1/1986 | Conti et al. | |
| 4,662,437 A | 5/1987 | Renfro | |
| 4,694,865 A | 9/1987 | Tauschmann | |
| 4,741,405 A | 5/1988 | Moeny et al. | |
| 4,744,420 A | 5/1988 | Patterson et al. | |
| 4,770,493 A | 9/1988 | Ara et al. | |
| 4,793,383 A | 12/1988 | Gyory et al. | |
| 4,830,113 A | 5/1989 | Geyer | |
| 4,860,654 A | 8/1989 | Chawla et al. | |
| 4,860,655 A | 8/1989 | Chawla | |
| 4,872,520 A | 10/1989 | Nelson | |
| 4,923,008 A * | 5/1990 | Wachowicz et al. | 166/373 |
| 4,989,236 A | 1/1991 | Myllymäki | |
| 4,997,250 A | 3/1991 | Ortiz, Jr. | |
| 5,003,144 A | 3/1991 | Lindroth et al. | |
| 5,004,166 A | 4/1991 | Sellar | |
| 5,033,545 A | 7/1991 | Sudol | |
| 5,049,738 A | 9/1991 | Gergely et al. | |
| 5,070,904 A | 12/1991 | McMahon et al. | |
| 5,078,546 A * | 1/1992 | Fisk et al. | 405/156 |
| 5,084,617 A | 1/1992 | Gergely | |
| 5,086,842 A | 2/1992 | Cholet | |
| 5,107,936 A | 4/1992 | Foppe | |
| 5,121,872 A | 6/1992 | Legget | |
| 5,125,061 A | 6/1992 | Marlier et al. | |
| 5,140,664 A | 8/1992 | Bosisio et al. | |
| 5,163,321 A | 11/1992 | Perales | |
| 5,172,112 A | 12/1992 | Jennings | |
| 5,212,755 A | 5/1993 | Holmberg | |
| 5,285,204 A | 2/1994 | Sas-Jaworsky | |
| 5,348,097 A | 9/1994 | Giannesini et al. | |
| 5,351,533 A | 10/1994 | Macadam et al. | |
| 5,353,875 A | 10/1994 | Schultz et al. | |
| 5,396,805 A | 3/1995 | Surjaatmadja | |
| 5,400,857 A | 3/1995 | Whitby et al. | |
| 5,411,081 A | 5/1995 | Moore et al. | |
| 5,411,085 A | 5/1995 | Moore et al. | |
| 5,411,105 A | 5/1995 | Gray | |
| 5,413,045 A | 5/1995 | Miszewski | |
| 5,413,170 A | 5/1995 | Moore | |
| 5,423,383 A | 6/1995 | Pringle | |
| 5,425,420 A | 6/1995 | Pringle | |
| 5,435,351 A | 7/1995 | Head | |
| 5,435,395 A | 7/1995 | Connell | |
| 5,463,711 A | 10/1995 | Chu | |
| 5,465,793 A | 11/1995 | Pringle | |
| 5,469,878 A | 11/1995 | Pringle | |
| 5,479,860 A | 1/1996 | Ellis | |
| 5,483,988 A | 1/1996 | Pringle | |
| 5,488,992 A | 2/1996 | Pringle | |
| 5,500,768 A | 3/1996 | Doggett et al. | |
| 5,503,014 A | 4/1996 | Griffith | |
| 5,503,370 A | 4/1996 | Newman et al. | |
| 5,505,259 A | 4/1996 | Wittrisch et al. | |
| 5,515,926 A | 5/1996 | Boychuk | |
| 5,561,516 A | 10/1996 | Noble et al. | |
| 5,566,764 A | 10/1996 | Elliston | |
| 5,573,225 A | 11/1996 | Boyle et al. | |
| 5,577,560 A | 11/1996 | Coronado et al. | |
| 5,599,004 A | 2/1997 | Newman et al. | |
| RE35,542 E * | 6/1997 | Fisk et al. | 405/156 |
| 5,638,904 A | 6/1997 | Misselbrook et al. | |
| 5,655,745 A | 8/1997 | Morrill | |
| 5,657,823 A * | 8/1997 | Kogure et al. | 166/340 |
| 5,694,408 A | 12/1997 | Bott et al. | |
| 5,735,502 A | 4/1998 | Levett et al. | |
| 5,757,484 A | 5/1998 | Miles et al. | |
| 5,771,974 A * | 6/1998 | Stewart et al. | 166/336 |
| 5,771,984 A | 6/1998 | Potter et al. | |
| 5,847,825 A | 12/1998 | Alexander | |
| 5,862,273 A | 1/1999 | Pelletier | |
| 5,864,113 A | 1/1999 | Cossi | |
| 5,896,482 A | 4/1999 | Blee et al. | |
| 5,896,938 A | 4/1999 | Moeny et al. | |
| 5,902,499 A | 5/1999 | Richerzhagen | |
| 5,924,489 A | 7/1999 | Hatcher | |
| 5,929,986 A | 7/1999 | Slater et al. | |
| 5,986,236 A | 11/1999 | Gainand et al. | |
| 5,986,756 A | 11/1999 | Slater et al. | |
| RE36,525 E | 1/2000 | Pringle | |
| 6,015,015 A | 1/2000 | Luft et al. | |
| 6,026,905 A * | 2/2000 | Garcia-Soule | 166/336 |
| 6,032,742 A | 3/2000 | Tomlin et al. | |
| 6,038,363 A | 3/2000 | Slater et al. | |
| 6,047,781 A | 4/2000 | Scott et al. | |
| RE36,723 E | 6/2000 | Moore et al. | |
| 6,084,203 A | 7/2000 | Bonigen | |
| 6,104,022 A | 8/2000 | Young et al. | |
| RE36,880 E | 9/2000 | Pringle | |
| 6,116,344 A * | 9/2000 | Longbottom et al. | 166/298 |
| 6,147,754 A | 11/2000 | Theriault et al. | |
| 6,166,546 A | 12/2000 | Scheihing et al. | |
| 6,173,770 B1 | 1/2001 | Morrill | |
| 6,215,734 B1 | 4/2001 | Moeny et al. | |
| 6,227,300 B1 | 5/2001 | Cunningham et al. | |
| 6,250,391 B1 | 6/2001 | Proudfoot | |

(56) References Cited

U.S. PATENT DOCUMENTS

| | | | |
|---|---|---|---|
| 6,273,193 B1 | 8/2001 | Hermann et al. | |
| 6,301,423 B1 | 10/2001 | Olson | |
| 6,321,839 B1 | 11/2001 | Vereecken et al. | |
| 6,325,159 B1 | 12/2001 | Peterman et al. | |
| 6,328,343 B1 * | 12/2001 | Hosie et al. | 285/90 |
| 6,352,114 B1 | 3/2002 | Toalson et al. | |
| 6,355,928 B1 | 3/2002 | Skinner et al. | |
| 6,356,683 B1 | 3/2002 | Hu et al. | |
| 6,384,738 B1 | 5/2002 | Carstensen et al. | |
| 6,386,300 B1 | 5/2002 | Curlett et al. | |
| 6,401,825 B1 | 6/2002 | Woodrow | |
| 6,426,479 B1 | 7/2002 | Bischof | |
| 6,437,326 B1 | 8/2002 | Yamate et al. | |
| 6,450,257 B1 | 9/2002 | Douglas | |
| 6,497,290 B1 | 12/2002 | Misselbrook et al. | |
| 6,543,538 B2 * | 4/2003 | Tolman et al. | 166/284 |
| 6,561,289 B2 | 5/2003 | Portman et al. | |
| 6,564,046 B1 | 5/2003 | Chateau | |
| 6,591,046 B2 | 7/2003 | Stottlemyer | |
| 6,615,922 B2 | 9/2003 | Deul et al. | |
| 6,626,249 B2 | 9/2003 | Rosa | |
| 6,644,848 B1 | 11/2003 | Clayton et al. | |
| 6,710,720 B2 | 3/2004 | Carstensen et al. | |
| 6,712,150 B1 | 3/2004 | Misselbrook et al. | |
| 6,719,042 B2 | 4/2004 | Johnson et al. | |
| 6,725,924 B2 * | 4/2004 | Davidson et al. | 166/250.01 |
| 6,737,605 B1 | 5/2004 | Kern | |
| 6,746,182 B2 | 6/2004 | Munk et al. | |
| 6,747,743 B2 | 6/2004 | Skinner et al. | |
| 6,755,262 B2 | 6/2004 | Parker | |
| 6,808,023 B2 | 10/2004 | Smith et al. | |
| 6,832,654 B2 | 12/2004 | Ravensbergen et al. | |
| 6,847,034 B2 | 1/2005 | Shah et al. | |
| 6,851,488 B2 | 2/2005 | Batarseh | |
| 6,860,525 B2 * | 3/2005 | Parks | 285/391 |
| 6,867,858 B2 | 3/2005 | Owen et al. | |
| 6,870,128 B2 | 3/2005 | Kobayashi et al. | |
| 6,874,361 B1 | 4/2005 | Meltz et al. | |
| 6,880,646 B2 | 4/2005 | Batarseh | |
| 6,885,784 B2 | 4/2005 | Bohnert | |
| 6,888,097 B2 | 5/2005 | Batarseh | |
| 6,888,127 B2 | 5/2005 | Jones et al. | |
| 6,912,898 B2 | 7/2005 | Jones et al. | |
| 6,913,079 B2 | 7/2005 | Tubel | |
| 6,920,395 B2 | 7/2005 | Brown | |
| 6,920,946 B2 | 7/2005 | Oglesby | |
| 6,957,576 B2 | 10/2005 | Skinner et al. | |
| 6,967,322 B2 | 11/2005 | Jones et al. | |
| 6,978,832 B2 | 12/2005 | Gardner et al. | |
| 6,994,162 B2 | 2/2006 | Robison | |
| 7,040,746 B2 | 5/2006 | McCain et al. | |
| 7,055,604 B2 | 6/2006 | Jee et al. | |
| 7,055,629 B2 | 6/2006 | Oglesby | |
| 7,072,044 B2 | 7/2006 | Kringlebotn et al. | |
| 7,072,588 B2 | 7/2006 | Skinner | |
| 7,086,467 B2 | 8/2006 | Schlegelmilch et al. | |
| 7,086,484 B2 | 8/2006 | Smith, Jr. | |
| 7,087,865 B2 | 8/2006 | Lerner | |
| 7,126,332 B2 | 10/2006 | Blanz et al. | |
| 7,134,488 B2 | 11/2006 | Tudor et al. | |
| 7,147,064 B2 | 12/2006 | Batarseh et al. | |
| 7,172,026 B2 | 2/2007 | Misselbrook | |
| 7,195,731 B2 | 3/2007 | Jones | |
| 7,199,869 B2 | 4/2007 | MacDougall | |
| 7,210,343 B2 | 5/2007 | Shammai et | |
| 7,212,283 B2 | 5/2007 | Hother et | |
| 7,249,633 B2 | 7/2007 | Ravensbergen et al. | |
| 7,264,057 B2 | 9/2007 | Rytlewski et al. | |
| 7,270,195 B2 | 9/2007 | MacGregor et al. | |
| 7,273,108 B2 | 9/2007 | Misselbrook | |
| 7,334,637 B2 | 2/2008 | Smith, Jr. | |
| 7,337,660 B2 | 3/2008 | Ibrahim et al. | |
| 7,362,422 B2 | 4/2008 | DiFoggio et al. | |
| 7,367,396 B2 | 5/2008 | Springett et al. | |
| 7,395,696 B2 | 7/2008 | Bissonnette et al. | |
| 7,395,866 B2 | 7/2008 | Milberger et al. | |
| 7,416,032 B2 | 8/2008 | Moeny et al. | |
| 7,416,258 B2 | 8/2008 | Reed et al. | |
| 7,471,831 B2 | 12/2008 | Bearman et al. | |
| 7,487,834 B2 | 2/2009 | Reed et al. | |
| 7,490,664 B2 | 2/2009 | Skinner et al. | |
| 7,503,404 B2 | 3/2009 | McDaniel et al. | |
| 7,516,802 B2 | 4/2009 | Smith, Jr. | |
| 7,518,722 B2 | 4/2009 | Julian et al. | |
| 7,527,108 B2 | 5/2009 | Moeny | |
| 7,530,406 B2 | 5/2009 | Moeny et al. | |
| 7,559,378 B2 | 7/2009 | Moeny | |
| 7,587,111 B2 | 9/2009 | De Monmorillon et al. | |
| 7,591,315 B2 | 9/2009 | Dore et al. | |
| 7,600,564 B2 | 10/2009 | Shampine et al. | |
| 7,671,983 B2 | 3/2010 | Shammai et al. | |
| 7,779,917 B2 | 8/2010 | Kotrla et al. | |
| 7,802,384 B2 | 9/2010 | Kobayashi et al. | |
| 7,832,477 B2 * | 11/2010 | Cavender et al. | 166/278 |
| 7,938,175 B2 | 5/2011 | Skinner et al. | |
| 7,980,306 B2 * | 7/2011 | Lovell et al. | 166/250.17 |
| 8,056,633 B2 * | 11/2011 | Barra et al. | 166/298 |
| 8,322,441 B2 | 12/2012 | Fenton | |
| 2002/0039465 A1 | 4/2002 | Skinner | |
| 2002/0189806 A1 | 12/2002 | Davidson et al. | |
| 2003/0000741 A1 | 1/2003 | Rosa | |
| 2003/0021634 A1 * | 1/2003 | Munk et al. | 405/224.2 |
| 2003/0053783 A1 | 3/2003 | Shirasaki | |
| 2003/0085040 A1 | 5/2003 | Hemphill et al. | |
| 2003/0094281 A1 | 5/2003 | Tubel | |
| 2003/0132029 A1 | 7/2003 | Parker | |
| 2003/0136927 A1 | 7/2003 | Baugh | |
| 2003/0145991 A1 | 8/2003 | Olsen | |
| 2004/0006429 A1 | 1/2004 | Brown | |
| 2004/0016295 A1 | 1/2004 | Skinner et al. | |
| 2004/0020643 A1 | 2/2004 | Thomeer et al. | |
| 2004/0033017 A1 | 2/2004 | Kringlebotn et al. | |
| 2004/0074979 A1 | 4/2004 | McGuire | |
| 2004/0093950 A1 | 5/2004 | Bohnert | |
| 2004/0119471 A1 | 6/2004 | Blanz et al. | |
| 2004/0129418 A1 | 7/2004 | Jee et al. | |
| 2004/0195003 A1 | 10/2004 | Batarseh | |
| 2004/0206505 A1 | 10/2004 | Batarseh | |
| 2004/0207731 A1 | 10/2004 | Bearman et al. | |
| 2004/0211894 A1 | 10/2004 | Hother et al. | |
| 2004/0218176 A1 | 11/2004 | Shammal et al. | |
| 2004/0244970 A1 | 12/2004 | Smith, Jr. | |
| 2004/0252748 A1 | 12/2004 | Gleitman | |
| 2004/0256103 A1 | 12/2004 | Batarseh | |
| 2005/0012244 A1 | 1/2005 | Jones | |
| 2005/0094129 A1 | 5/2005 | MacDougall | |
| 2005/0099618 A1 | 5/2005 | DiFoggio et al. | |
| 2005/0201652 A1 | 9/2005 | Ellwood, Jr. | |
| 2005/0212284 A1 * | 9/2005 | Dole | 285/110 |
| 2005/0230107 A1 | 10/2005 | McDaniel et al. | |
| 2005/0252286 A1 | 11/2005 | Ibrahim et al. | |
| 2005/0268704 A1 | 12/2005 | Bissonnette et al. | |
| 2005/0269132 A1 | 12/2005 | Batarseh et al. | |
| 2005/0272512 A1 | 12/2005 | Bissonnette et al. | |
| 2005/0272513 A1 | 12/2005 | Bissonnette et al. | |
| 2005/0272514 A1 | 12/2005 | Bissonnette et al. | |
| 2005/0282645 A1 | 12/2005 | Bissonnette et al. | |
| 2006/0038997 A1 | 2/2006 | Julian et al. | |
| 2006/0065815 A1 | 3/2006 | Jurca | |
| 2006/0102343 A1 | 5/2006 | Skinner et al. | |
| 2006/0118303 A1 | 6/2006 | Schultz et al. | |
| 2006/0185843 A1 | 8/2006 | Smith, Jr. | |
| 2006/0191684 A1 | 8/2006 | Smith, Jr. | |
| 2006/0201682 A1 | 9/2006 | Reynolds | |
| 2006/0204188 A1 | 9/2006 | Clarkson et al. | |
| 2006/0231257 A1 | 10/2006 | Reed et al. | |
| 2006/0237233 A1 | 10/2006 | Reed et al. | |
| 2007/0125163 A1 | 6/2007 | Dria et al. | |
| 2007/0227741 A1 | 10/2007 | Lovell et al. | |
| 2007/0247701 A1 | 10/2007 | Akasaka et al. | |
| 2007/0267220 A1 | 11/2007 | Magiawala et al. | |
| 2007/0280615 A1 | 12/2007 | de Montmorillon et al. | |
| 2008/0078081 A1 | 4/2008 | Huff et al. | |
| 2008/0093125 A1 | 4/2008 | Potter et al. | |

(56) References Cited

U.S. PATENT DOCUMENTS

| | | |
|---|---|---|
| 2008/0099701 A1 | 5/2008 | Whitby et al. |
| 2008/0138022 A1 | 6/2008 | Tassone |
| 2008/0180787 A1 | 7/2008 | DiGiovanni et al. |
| 2008/0245568 A1 | 10/2008 | Jeffryes |
| 2008/0273852 A1 | 11/2008 | Parker et al. |
| 2009/0050371 A1 | 2/2009 | Moeny |
| 2009/0133929 A1 | 5/2009 | Rodland |
| 2009/0205675 A1 | 8/2009 | Sarker et al. |
| 2009/0260829 A1 | 10/2009 | Mathis |
| 2009/0272424 A1 | 11/2009 | Ortabasi |
| 2009/0279835 A1 | 11/2009 | de Montmorillon et al. |
| 2009/0294050 A1 | 12/2009 | Traggis et al. |
| 2010/0000790 A1 | 1/2010 | Moeny |
| 2010/0001179 A1 | 1/2010 | Kobayashi et al. |
| 2010/0032207 A1 | 2/2010 | Potter et al. |
| 2010/0044102 A1 | 2/2010 | Rinzler et al. |
| 2010/0044103 A1 | 2/2010 | Moxley et al. |
| 2010/0044104 A1 | 2/2010 | Zediker et al. |
| 2010/0044105 A1 | 2/2010 | Faircloth et al. |
| 2010/0044106 A1 | 2/2010 | Zediker et al. |
| 2010/0051847 A1 | 3/2010 | Mailand et al. |
| 2010/0071794 A1 | 3/2010 | Homan |
| 2010/0078414 A1 | 4/2010 | Perry et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0147528 A1 | 6/2010 | Baugh |
| 2010/0164223 A1 | 7/2010 | Curtiss, III et al. |
| 2010/0197116 A1 | 8/2010 | Shah et al. |
| 2010/0215326 A1 | 8/2010 | Zediker et al. |
| 2010/0218955 A1 | 9/2010 | Hart |
| 2010/0326659 A1 | 12/2010 | Schultz et al. |
| 2010/0326665 A1 | 12/2010 | Redlinger et al. |
| 2011/0030367 A1 | 2/2011 | Dadd |
| 2012/0000646 A1 | 1/2012 | Liotta et al. |
| 2012/0020631 A1 | 1/2012 | Rinzler et al. |
| 2012/0061091 A1 | 3/2012 | Radi |
| 2012/0067643 A1 | 3/2012 | DeWitt et al. |
| 2012/0068086 A1 | 3/2012 | DeWitt et al. |
| 2012/0074110 A1 | 3/2012 | Zediker et al. |
| 2012/0217017 A1 | 8/2012 | Zediker et al. |
| 2012/0217018 A1 | 8/2012 | Zediker et al. |
| 2012/0217019 A1 | 8/2012 | Zediker et al. |
| 2012/0248078 A1 | 10/2012 | Zediker et al. |
| 2012/0255774 A1 | 10/2012 | Grubb et al. |
| 2012/0255933 A1 | 10/2012 | McKay et al. |
| 2012/0261188 A1 | 10/2012 | Zediker et al. |
| 2012/0266803 A1 | 10/2012 | Zediker et al. |
| 2012/0267168 A1 | 10/2012 | Grubb et al. |
| 2012/0273269 A1 | 11/2012 | Rinzler et al. |
| 2012/0273470 A1 | 11/2012 | Zediker et al. |
| 2012/0275159 A1 | 11/2012 | Fraze et al. |
| 2013/0011102 A1 | 1/2013 | Rinzler et al. |
| 2013/0161007 A1* | 6/2013 | Wolfe et al. .................. 166/297 |
| 2013/0168081 A1* | 7/2013 | Yang et al. .................. 166/247 |

FOREIGN PATENT DOCUMENTS

| | | | |
|---|---|---|---|
| FR | 2 716 924 A1 | 9/1995 | |
| JP | 63242483 A | * 10/1988 | ............. B23K 26/00 |
| JP | 09072738 A | 3/1997 | |
| WO | WO 97/49893 A1 | 12/1997 | |
| WO | WO 98/50673 A1 | 11/1998 | |
| WO | WO 02/057805 A2 | 7/2002 | |
| WO | WO 2004/009958 A1 | 1/2004 | |
| WO | WO 2006/008155 A1 | 1/2006 | |
| WO | WO 2006/054079 A1 | 5/2006 | |
| WO | WO 2010/060177 A1 | 6/2010 | |

OTHER PUBLICATIONS

U.S. Appl. No. 12/543,986, filed Aug. 19, 2009, Moxley et al.
U.S. Appl. No. 12/544,038, filed Aug. 19, 2009, Zediker et al.
U.S. Appl. No. 12/544,094, filed Aug. 19, 2009, Faircloth et al.
U.S. Appl. No. 12/544,136, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/347,445, filed Jan. 10, 2012, Zediker et al.
U.S. Appl. No. 13/366,882, filed Feb. 6, 2012, McKay et al.
U.S. Appl. No. 13/403,132, filed Feb. 23, 2012, Zediker et al.
U.S. Appl. No. 13/403,287, filed Feb. 23, 2012, Grubb et al.
U.S. Appl. No. 13/403,509, filed Feb. 23, 2012, Fraze et al.
U.S. Appl. No. 13/403,615, filed Feb. 23, 2012, Grubb et al.
U.S. Appl. No. 13/403,692, filed Feb. 23, 2012, Zediker et al.
U.S. Appl. No. 13/403,723, filed Feb. 23, 2012, Rinzler et al.
U.S. Appl. No. 13/403,741, filed Feb. 23, 2012, Zediker et al.
U.S. Appl. No. 13/486,795, filed Jun. 1, 2012, Rinzler et al.
U.S. Appl. No. 13/565,345, filed Aug. 2, 2012, Zediker et al.
Related utility application assigned U.S. Appl. No. 13/565,345, filed Aug. 2, 2012, 112 pages.
International Search Report for PCT Application No. PCT/US09/54295, dated Apr. 26, 2010, 16 pgs.
International Search Report and Written Opinion for PCT App. No. PCT/US10/24368, dated Nov. 2, 2010, 16 pgs.
International Search Report for PCT Application No. PCT/US2012/026471, dated May 30, 2012, 13 pgs.
International Search Report for PCT Application No. PCT/US2012/026494, dated May 31, 2012, 12 pgs.
International Search Report for PCT Application No. PCT/US2012/026525, dated May 31, 2012, 8 pgs.
International Search Report for PCT Application No. PCT/US2012/026526, dated May 31, 2012, 10 pgs.
Agrawal Dinesh et al., Report on "Development of Advanced Drill Components for BHA Using Mircowave Technology Incorporating Carbide Diamond Composites and Functionally Graded Materials", believed to be published by Microwave Processing and Engineering Center, Material Research Institute, The Pennsylvania State University, 2003, 10 pgs.
Agrawal Dinesh et al., Report on "Graded Steel-Tungsten Cardide/Cobalt-Diamond Systems Using Microwave Heating", *Proceedings of the 2002 International Conference on Functionally Graded Materials*, 2002, pp. 50-58.
Agrawal Dinesh et al., "Microstructural Examination by TEM of WC/Co composites Prepared by Conventional and Microwave Processes", *15th International Plansee Seminar*, vol. 2, , 2001, pp. 677-684.
Agrawal, Govind P., "Nonlinear Fiber Optics", Chap. 9, Fourth Edition, believed to be published by Academic Press copyright 2007, pp. 334-337.
Ai, H.A. et al., "Simulation of dynamic response of granite: A numerical approach of shock-induced damage beneath impact craters", *International Journal of Impact Engineering*, vol. 33, 2006, pp. 1-10.
Anton, Richard J. et al., "Dynamic Vickers indentation of brittle materials", *Wear*, vol. 239, 2000, pp. 27-35.
Ashby, M. F. et al., "The Failure of Brittle Solids Containing Small Cracks Under Compressive Stress States", *Acta Metall.*, vol. 34, No. 3, 1986, pp. 497-510.
Aydin, A. et al., "The Schmidt hammer in rock material characterization", *Engineering Geology*, vol. 81, 2005, pp. 1-14.
Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.
Bailo, El Tahir et al., "Spectral signatures and optic coefficients of surface and reservoir shales and limestones at COIL, $CO_2$ and Nd:YAG laser wavelengths", believed to be published by *Petroleum Engineering Department, Colorado School of Mines*, 2004, 13 pgs.
Baird, J. A. "GEODYN: A Geological Formation/Drillstring Dynamics Computer Program", *Society of Petroleum Engineers of AIME*, 1964, 9 pgs.

(56) References Cited

OTHER PUBLICATIONS

Baird, Jerold et al., Phase 1 Theoretical Description, A Geological Formation Drill String Dynamic Interaction Finite Element Program (GEODYN), *Sandia National Laboratories*, Report No. Sand-84-7101, 1984, 196 pgs.

Batarseh, S. et al. "Well Perforation Using High-Power Lasers", *Society of Petroleum Engineers*, SPE 84418, 2003, pp. 1-10.

Author Unknown, "Geothermal Completion Technology Life-Cycle Cost Model (GEOCOM)", believed to be published by BDM Corporation, *Sandia National Laboratories*, for the U.S. Dept. of Energy, vols. 1 and 2, 1982, 222 pgs.

Beste, U. et al., "Micro-scratch evaluation of rock types—a means to comprehend rock drill wear", *Tribology International*, vol. 37, 2004, pp. 203-210.

Blackwell, B. F., "Temperature Profile in Semi-infinite Body With Exponential Source and Convective Boundary Condition", *Journal of Heat Transfer, Transactions of the ASME*, vol. 112, 1990, pp. 567-571.

Britz, Dieter, "Digital Simulation in Electrochemistry", *Lect. Notes Phys.*, vol. 666, 2005, pp. 103-117.

Browning, J. A. et al., "Recent Advances in Flame Jet Working of Minerals", $7^{th}$ *Symposium on Rock Mechanics*, 1965, pp. 281-313.

Cardenas, R., "Protected Polycrystalline Diamond Compact Bits for Hard Rock Drilling", Report No. DOE-99049-1381, believed to be published by U.S. Department of Energy, 2000, pp. 1-79.

Carstens, Jeffrey et al., "Heat-Assisted Tunnel Boring Machines", *Federal Railroad Administration and Urban Mass Transportation Administration*, believed to be published by U.S. Dept. of Transportation, Report No. FRA-RT-71-63, 1970, 340 pgs.

Clegg, John et al., "Improved Optimisation of Bit Selection Using Mathematically Modelled Bit-Performance Indices",*IADC/SPE International 102287*, 2006, pp. 1-10.

Close, F. et al., "Successful Drilling of Basalt in a West of Shetland Deepwater Discovery", *SPE International 96575*, Society of Petroleum Engineers, 2006, pp. 1-10.

Cobern, Martin E., "Downhole Vibration Monitoring & Control System Quarterly Technical Report #1", *APS Technology, Inc.*, Quarterly Technical Report #1, DVMCS, 2003, pp. 1-15.

Cogotsi, G. A. et al., "Use of Nondestructive Testing Methods in Evaluation of Thermal Damage for Ceramics Under Conditions of Nonstationary Thermal Effects", *Institute of Strength Problems, Academy of Sciences of the Ukrainian SSR*, 1985, pp. 52-56.

Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.

Dahl, Filip et al., "Development of a new direct test method for estimating cutter life, based on the Sievers J miniature drill test", *Tunnelling and Underground Space Technology*, vol. 22, 2007, pp. 106-116.

Damzen, M. J. et al., "Stimulated Brillion Scattering", Chapter 8—SBS in Optical Fibres, OP Publishing Ltd, Published by Institute of Physics, London, England, 2003, pp. 137-153.

Das, A. C. et al., "Acousto-ultrasonic study of thermal shock damage in castable refractory", *Journal of Materials Science Letters*, vol. 10, 1991, pp. 173-175.

De Guire, Mark R., "Thermal Expansion Coefficient (start)", *EMSE 201—Introduction to Materials Science & Engineering*, 2003, pp. 15.1-15.15.

Dinçer, Ismail et al., "Correlation between Schmidt hardness, uniaxial compressive strength and Young's modulus for andesites, basalts and tuffs", *Bull Eng Geol Env*, vol. 63, 2004, pp. 141-148.

Dunn, James C., "Geothermal Technology Development at Sandia", believed to be published by *Geothermal Research Division, Sandia National Laboratories*, 1987, pp. 1-6.

Eichler, H.J. et al., "Stimulated Brillouin Scattering in Multimode Fibers for Optical Phase Conjugation", *Optics Communications*, vol. 208, 2002, pp. 427-431.

Eighmy, T. T. et al., "Microfracture Surface Charaterizations: Implications for In Situ Remedial Methods in Fractured Rock", believed to be published by *U.S. Environmental Protection Agency*, EPA/600/R-05/121, 2006, pp. 1-99.

Elsayed, M.A. et al., "Measurement and analysis of Chatter in a Compliant Model of a Drillstring Equipped With a PDC Bit", *Mechanical Engineering Dept.*, believed to be published by *University of Southwestern Louisiana and Sandia National Laboratories*, 2000, pp. 1-10.

Ferro, D. et al., "Vickers and Knoop hardness of electron beam deposited ZrC and HfC thin films on titanium", *Surface & Coatings Technology*, vol. 200, 2006, pp. 4701-4707.

Figueroa, H. et al., "Rock removal using high power lasers for petroleum exploitation purposes", believed to be published by *Gas Technology Institute, Colorado School of Mines, Halliburton Energy Services, Argonne National Laboratory*, 2002, pp. 1-13.

Finger, John T. et al., "PDC Bit Research at Sandia National Laboratories", believed to be published by *Sandia National Laboratories*, SAND89-0079-UC-253, 1989, pp. 1-88.

Gahan, Brian C. et al. "Analysis of Efficient High-Power Fiber Lasers for Well Perforation", *Society of Petroleum Engineers*, SPE 90661, 2004, pp. 1-9.

Gahan, Brian C. et al. "Effect of Downhole Pressure Conditions on High-Power Laser Perforation", *Society of Petroleum Engineers*, SPE 97093, 2005, pp. 1-7.

Gahan, B. C. et al., "Laser Drilling: Determination of Energy Required to Remove Rock", *Society of Petroleum Engineers* International, SPE 71466, 2001, pp. 1-11.

Gahan, Brian C. et al., "Laser Drilling: Drilling with the Power of Light, Phase 1: Feasibility Study", *Topical Report*, Cooperative Agreement No. DE-FC26-00NT40917, 2000-2001, pp. 1-148.

Glowka, David A., "Design Considerations for a Hard-Rock PDC Drill Bit", believed to be published by *Sandia National Laboratories*, SAND-85-0666C, DE85 008313, 1985, pp. 1-23.

Glowka, David A., "Development of a Method for Predicting the Performance and Wear of PDC Drill Bits", believed to be published by *Sandia National Laboratories*, SAND86-1745-UC-66c, 1987, pp. 1-206.

Glowka, David A. et al., "Program Plan for the Development of Advanced Synthetic-Diamond Drill Bits for Hard-Rock Drilling", believed to be published by *Sandia National Laboratories*, SAND 93-1953, 1993, pp. 1-50.

Glowka, David A. et al., "Progress in the Advanced Synthetic-Diamond Drill Bit Program", believed to be published by *Sandia National Laboratories*, SAND95-2617C, 1994, pp. 1-9.

Glowka, David A., "The Use of Single-Cutter Data in the Analysis of PDC Bit Designs", *61st Annual Technical Conference and Exhibition of Society of Petroleum Engineers*, 1986, pp. 1-37.

Graves, Ramona M. et al., "Application of High Power Laser Technology to Laser/Rock Destruction: Where Have We Been? Where Are We Now?", *SW AAPG Convention*, 2002, pp. 213-224.

Graves, Ramona M. et al., "Laser Parameters That Effect Laser-Rock Interaction: Determining the Benefits of Applying Star Wars Laser Technology for Drilling and Completing Oil and Natural Gas Wells", Topical Report, believed to be published by *Petroleum Engineering Department, Colorado School of Mines*, 2001, pp. 1-157.

Gurarie, V. N., "Stress resistance parameters of brittle solids under laser/plasma pulse heating", *Materials Science and Engineering*, vol. A288, 2000, pp. 168-172.

Habib, P. et al., "The Influence of Residual Stresses on Rock Hardness", *Rock Mechanics*, vol. 6, 1974, pp. 15-24.

Hall, Kevin, "The role of thermal stress fatigue in the breakdown of rock in cold regions", *Geomorphology*, vol. 31, 1999, pp. 47-63.

Han, Wei, "Computational and experimental investigations of laser drilling and welding for microelectronic packaging", *Dorchester Polytechnic Institute*, A Dissertation submitted in May 2004, pp. 1-242.

Hareland, G. et al., "Cutting Efficiency of a Single PDC Cutter on Hard Rock", *Journal of Canadian Petroleum Technology*, vol. 48, No. 6, 2009, pp. 1-6.

Hashida, T. et al., "Numerical simulation with experimental verification of the fracture behavior in granite under confining pressures

(56) References Cited

OTHER PUBLICATIONS based on the tension-softening model", *International Journal of Fracture*, vol. 59, 1993, pp. 227-244.
Healy, Thomas E., "Fatigue Crack Growth in Lithium Hydride", believed to be published by *Lawrence Livermore National Laboratory*, 1993, pp. 1-32.
Hettema, M. H. H. et al., "The Influence of Steam Pressure on Thermal Spelling of Sedimentary Rock: Theory and Experiments", *Int. J. Rock Mech. Min. Sci.*, vol. 35, No. 1, 1998, pp. 3-15.
Hibbs, Louis E. et al., "Wear Mechanisms for Polycrystalline-Diamond Compacts as Utilized for Drilling in Geothermal Environments", believed to be published by *Sandia National Laboratories*, for the United States Government, Report No. SAND-82-7213, 1983, 287 pgs.
Hoek, E., "Fracture of Anisotropic Rock", *Journal of the South African Institute of Mining and Metallurgy*, vol. 64, No. 10, 1964, pp. 501-523.
Hoover, Ed R. et al., "Failure Mechanisms of Polycrystalline-Diamond Compact Drill Bits in Geothermal Environments", Sandia Report, believed to be published by *Sandia National Laboratories*, SAND81-1404, 1981, pp. 1-35.
Huff, C. F. et al., "Recent Developments in Polycrystalline Diamond-Drill-Bit Design", believed to be published by *Sandia National Laboratories*, 1980, pp. 1-29.
Jimeno, Carlos Lopez et al., Drilling and Blasting of Rocks, a. a. *Balkema Publishers*, 1995, 30 pgs.
Kahraman, S. et al., "Dominant rock properties affecting the penetration rate of percussive drills", *International Journal of Rock Mechanics and Mining Sciences*, 2003, vol. 40, pp. 711-723.
Kelsey, James R., "Drilling Technology/GDO", believed to be published by *Sandia National Laboratories*, SAND-85-1866c, DE85 017231, 1985, pp. 1-7.
Kerr, Callin Joe, "PDC Drill Bit Design and Field Application Evolution", *Journal of Petroleum Technology*, 1988, pp. 327-332.
Ketata, C. et al., "Knowledge Selection for Laser Drilling in the Oil and Gas Industry", *Computer Society*, 2005, pp. 1-6.
Khan, Ovais U. et al., "Laser heating of sheet metal and thermal stress development", *Journal of Materials Processing Technology*, vol. 155-156, 2004, pp. 2045-2050.
Kim, K. R. et al., "$CO_2$ laser-plume interaction in materials processing", *Journal of Applied Physics*, vol. 89, No. 1, 2001, pp. 681-688.
Klotz, K. et al., "Coatings with intrinsic stress profile: Refined creep analysis of (Ti,Al)N and cracking due to cyclic laser heating", *Thin Solid Films*, vol. 496, 2006, pp. 469-474.
Kobayashi, Toshio et al., "Drilling a 2-inch in Diameter Hole in Granites Submerged in Water by $CO_2$ Lasers", *SPE International*, IADC 119914 Drilling Conference and Exhibition, 2009, pp. 1-11.
Kubacki, Emily et al., "Optics for Fiber Laser Applications", believed to be published by CVI Laser, LLC, Technical Reference Document #20050415, 2005, 5 pgs.
Kujawski, Daniel, "A fatigue crack driving force parameter with load ratio effects", *International Journal of Fatigue*, vol. 23, 2001, pp. S239-S246.
Labuz, J. F. et al., "Microrack-dependent fracture of damaged rock", *International Journal of Fracture*, vol. 51, 1991, pp. 231-240.
Lacy, Lewis L., "Dynamic Rock Mechanics Testing for Optimized Fracture Designs", *Society of Petroleum Engineers International, Annual Technical Conference and Exhibition*, 1997, pp. 23-36.
Lally, Evan M., "A Narrow-Linewidth Laser at 1550 nm Using the Pound-Drever-Hall Stabilization Technique", *Thesis*, submitted to Virginia Polytechnic Institute and State University, Blacksburg, Virginia, 2006, 92 pgs.
Lau, John H., "Thermal Fatigue Life Prediction of Flip Chip Solder Joints by Fracture Mechanics Method", *Engineering Fracture Mechanics*, vol. 45, No. 5, 1993, pp. 643-654.
Leong, K. H. et al., "Lasers and Beam Delivery for Rock Drilling", believed to be published by Argonne National Laboratory, ANL/TD/TM03-01, 2003, pp. 1-35.
Leung, M. et al., "Theoretical study of heat transfer with moving phase-change interface in thawing of frozen food", *Journal of Physics D: Applied Physics*, vol. 38, 2005, pp. 477-482.
Lima, R. S. et al., "Elastic Modulus Measurements via Laser-Ultrasonic and Knoop Indentation Techniques in Thermally Sprayed Coatings", *Journal of Thermal Spray Technology*, vol. 14(1), 2005, pp. 52-60.
Lin, Y. T., "The Impact of Bit Performance on Geothermal-Well Cost", believed to be published by *Sandia National Laboratories*, SAND-81-1470C, 1981, pp. 1-6.
Lomov, I. N. et al., "Explosion in the Granite Field: Hardening and Softening Behavior in Rocks", believed to be published by *Lawrence Livermore National Laboratory*, 2001, pp. 1-7.
Long, S. G. et al., "Thermal fatigue of particle reinforced metal-matrix composite induced by laser heating and mechanical load", *Composites Science and Technology*, vol. 65, 2005, pp. 1391-1400.
Lyons, K. David et al., "NETL Extreme Drilling Laboratory Studies High Pressure High Temperature Drilling Phenomena", believed to be published by *National Energy Technology Laboratory*, 2007, pp. 1-6.
McElhenny, John E. et al., "Unique Characteristic Features of Stimulated Brillouin Scattering in Small-Core Photonic Crystal Fibers", *J. Opt. Soc. Am. B*, vol. 25, No. 4, 2008, pp. 582-593.
Marshall, David B. et al., "Indentation of Brittle Materials", *Microindentation Techniques in Materials Science and Engineering, ASTM STP 889; American Society for Testing and Materials*, 1986, pp. 26-46.
Maurer, William C., "Advanced Drilling Techniques", published by Petroleum Publishing Co., copyright 1980, 26 pgs.
Maurer, William C., "Novel Drilling Techniques", published by Pergamon Press, UK, copyright 1968, pp. 1-64.
Mazerov, Katie, "Bigger coil sizes, hybrid rigs, rotary steerable advances push coiled tubing drilling to next level", *Drilling Contractor*, 2008, pp. 54-60.
Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.
Mensa-Wilmot, Graham et al., "Advanced Cutting Structure Improves PDC Bit Performance in Hard and Abrasive Drilling Environments", *Society of Petroleum Engineers International*, 2003, pp. 1-13.
Messaoud, Louafi, "Influence of Fluids on the Essential Parameters of Rotary Percussive Drilling", *Laboratoire d'Environnement* (Tébessa), vol. 14, 2009, pp. 1-8.
Mocofanescu, A. et al., "SBS threshold for single mode and multimode GRIN fibers in an all fiber configuration", *Optics Express*, vol. 13, No. 6, 2005, pp. 2019-2024.
Moradian, Z. A. et al., "Predicting the Uniaxial Compressive Strength and Static Young's Modulus of Intact Sedimentary Rocks Using the Ultrasonic Test", *International Journal of Geomechanics*, vol. 9, No. 1, 2009, pp. 14-19.
Muto, Shigeki et al., "Laser cutting for thick concrete by multi-pass technique", *Chinese Optics Letters*, vol. 5 Supplement, 2007, pp. S39-S41.
Naqavi, I. Z. et al., "Laser heating of multilayer assembly and stress levels: elasto-plastic consideration", *Heat and Mass Transfer*, vol. 40, 2003, pp. 25-32.
Nara, Y. et al., "Sub-critical crack growth in anisotropic rock", *International Journal of Rock Mechanics and Mining Sciences*, vol. 43, 2006, pp. 437-453.
Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.
O'Hare, Jim et al., "Design Index: A Systematic Method of PDC Drill-Bit Selection", *Society of Petroleum Engineers International*, IADC/SPE Drilling Conference, 2000, pp. 1-15.
Okon, P. et al., "Laser Welding of Aluminium Alloy 5083", *21st International Congress on Applications of Lasers and Electro-Optics*, 2002, pp. 1-9.

(56) References Cited

OTHER PUBLICATIONS

Ortega, Alfonso et al., "Frictional Heating and Convective Cooling of Polycrystalline Diamond Drag Tools During Rock Cutting", Report No. SAND 82-0675c, believed to be published by *Sandia National Laboratories*, 1982, 23 pgs.

Ortega, Alfonso et al., "Studies of the Frictional Heating of Polycrystalline Diamond Compact Drag Tools During Rock Cutting", believed to be published by *Sandia National Laboratories*, SAND-80-2677, 1982, pp. 1-151.

Ortiz, Blas et al., Improved Bit Stability Reduces Downhole Harmonics (Vibrations), *International Association of Drilling Contractors/Society of Petroleum Engineers Inc.*, 1996, pp. 379-389.

Palashchenko, Yuri A., "Pure Rolling of Bit Cones Doubles Performance", *I & Gas Journal*, vol. 106, 2008, 8 pgs.

Pardoen, T. et al., "An extended model for void growth and Coalescence", *Journal of the Mechanics and Physics of Solids*, vol. 48, 2000, pp. 2467-2512.

Park, Un-Chul et al., "Thermal Analysis of Laser Drilling Processes", *IEEE Journal of Quantum Electronics*, 1972, vol. QK-8, No. 2, 1972, pp. 112-119.

Parker, Richard A. et al., "Laser Drilling Effects of Beam Application Methods on Improving Rock Removal", *Society of Petroleum Engineers*, SPE 84353, 2003, pp. 1-7.

Pavlina, E. J. et al., "Correlation of Yield Strength and Tensile Strength with Hardness for Steels", *Journals of Materials Engineering and Performance*, vol. 17, No. 6, 2008, pp. 888-893.

Ping, Cao et al., "Testing study of subcritical crack growth rate and fracture toughness in different rocks", *Transactions of Nonferrous Metals Society of China*, vol. 16, 2006, pp. 709-714.

Plinninger, Ralf J. et al., "Predicting Tool Wear in Drill and Blast", *Tunnels & Tunneling International Magazine*, 2002, pp. 1-5.

Plinninger, Dr. Ralf J. et al., "Wear Prediction in Hardrock Excavation Using the CERCHAR Abrasiveness Index (CAI)", *EUROCK 2004 & 53rd Geomechanics Colloquium*. Schubert (ed.), VGE, 2004, pp. 1-6.

Polsky, Yarom et al., "Enhanced Geothermal Systems (EGS) Well Construction Technology Evaluation Report", believed to be published by *Sandia National Laboratories*, Sandia Report, SAND2008-7866, 2008, pp. 1-108.

Pooniwala, Shahvir, "Lasers: The Next Bit", *Society of Petroleum Engineers*, No. SPE 104223, 2006, pp. 1-10.

Potyondy, D. O. et al., "A Bonded-particle model for rock", *International Journal of Rock Mechanics and Mining Sciences*, vol. 41, 2004, pp. 1329-1364.

Qixian, Luo et al., "Using compression wave ultrasonic transducers to measure the velocity of surface waves and hence determine dynamic modulus of elasticity for concrete", *Construction and Building Materials*, vol. 10, No. 4, 1996, pp. 237-242.

Radkte, Robert, "New High Strength and faster Drilling TDP Diamond Cutters", Report by *Technology International, Inc.*, DOE Award No. DE-FC26-97FT34368, 2006, 97 pgs.

Rauenzahn, R. M., "Analysis of Rock Mechanics and Gas Dynamics of Flame-Jet Thermal Spallation Drilling", believed to be published by *Massachusetts Institute of Technology*, submitted in partial fulfillment of doctorate degree, 1986, pp. 1-583.

Rauenzahn, R. M. et al., "Rock Failure Mechanisms of Flame-Jet Thermal Spallation Drilling—Theory and Experimental Testing", *Int. J. Rock Merch. Min. Sci. & Geomech. Abstr.*, vol. 26, No. 5, 1989, pp. 381-399.

Raymond, David W., "PDC Bit Testing At Sandia Reveals Influence of Chatter in Hard-Rock Drilling", *Geothermal Resources Council Monthly Bulletin*, SAND99-2655J, 1999, 7 pgs.

Rossmanith, H. P. et al., "Wave Propagation, Damage Evolution, and Dynamic Fracture Extension. Part I. Percussion Drilling", *Materials Science*, vol. 32, No. 3, 1996, pp. 350-358.

Sachpazis, C. I, M. Sc., Ph. D., "Correlating Schmidt Hardness With Compressive Strength and Young's Modulus of Carbonate Rocks", *International Association of Engineering Geology*, Bulletin, No. 42, 1990, pp. 75-83.

Sano, Osam et al., "Acoustic Emission During Slow Crack Growth", believed to be published by *Department of Mining and Mineral Engineering, NII-Electronic Library Service*, 1980, pp. 381-388.

Schormair, Nik et al., "The influence of anisotropy on hard rock drilling and cutting", *The Geological Society of London*, IAEG, Paper No. 491, 2006, pp. 1-11.

Shannon, G. J. et al., "High power laser welding in hyperbaric gas and water environments", *Journal of Laser Applications*, vol. 9, 1997, pp. 129-136.

Shuja, S. Z. et al., "Laser heating of semi-infinite solid with consecutive pulses: Influence of materaial properties on temperature field", *Optics & Laser Technology*, vol. 40, 2008, pp. 472-480.

Smith, E., "Crack Propagation at a Constant Crack Tip Stress Intensity Factor", *Int. Journal of Fracture*, vol. 16, 1980, pp. R215-R218.

Solomon, A. D. et al., "Moving Boundary Problems in Phase Change Models Current Research Questions", *Engineering Physics and Mathematics Division*, ACM Signum Newsletter, vol. 20, Issue 2, 1985, pp. 8-12.

Sousa, Luis M. O. et al., "Influence of microfractures and porosity on the physico-mechanical properties and weathering of ornamental granites", *Engineering Geology*, vol. 77, 2005, pp. 153-168.

Stone, Charles M. et al., "Qualification of a Computer Program for Drill String Dynamics", believed to be published by *Sandia National Laboratories*, SAND-85-0633C, 1985, pp. 1-20.

Takarli, Mokhfi et al., "Damage in granite under heating/cooling cycles and water freeze-thaw condition", *International Journal of Rock Mechanics and Mining Sciences*, vol. 45, 2008, pp. 1164-1175.

Tanaka, K. et al., "The Generalized Relationship Between the Parameters C and m of Paris' Law for Fatigue Crack Growth", *Scripta Metallurgica*, vol. 15, No. 3, 1981, pp. 259-264.

Tang, C. A. et al., "Coupled analysis of flow, stress and damage (FSD) in rock failure", *International Journal of Rock Mechanics and Mining Sciences*, vol. 39, 2002, pp. 477-489.

Thorsteinsson, Hildigunnur et al., "The Impacts of Drilling and Reservoir Technology Advances on EGS Exploitation", Proceedings, *Thirty-Third Workshop on Geothermal Reservoir Engineering, Institute for Sustainable Energy, Environment, and Economy* (ISEEE), 2008, pp. 1-14.

Author unknown, "Chapter 6—Drilling Technology and Costs", from Report for the Future of Geothermal Energy, believed to be published by the U.S. Dept. of Energy, 2005, 53 pgs.

Varnado, S. G. et al., "The Design and Use of Polycrystalline Diamond Compact Drag Bits in the Geothermal Environment", *Society of Petroleum Engineers of AIME*, SPE 8378, 1979, pp. 1-11.

Wen-gui, Cao et al., "Damage constituitive model for strain-softening rock based on normal distribution and its parameter determination", *J. Cent. South Univ. Technol.*, vol. 14, No. 5, 2007, pp. 719-724.

Wiercigroch, M., "Dynamics of ultrasonic percussive drilling of hard rocks", *Journal of Sound and Vibration*, vol. 280, 2005, pp. 739-757.

Williams, R. E. et al., "Experiments in Thermal Spallation of Various Rocks", *Transactions of the ASME*, vol. 118, 1996, pp. 2-8.

Willis, David A. et al., "Heat transfer and phase change during picosecond laser ablation of nickel", *International Journal of Heat and Mass Transfer*, vol. 45, 2002, pp. 3911-3918.

Wong, Teng-fong et al., "Microcrack statistics, Weibull distribution and micromechanical modeling of compressive failure in rock", *Mechanics of Materials*, vol. 38, 2006, pp. 664-681.

Wood, Tom, "Dual Purpose COTD™ Rigs Establish New Operational Records", believed to be published by Treme Coil Drilling Corp., *Drilling Technology Without Borders*, 2009, pp. 1-18.

Xia, K. et al., "Effects of microstructures on dynamic compression of Barre granite", *International Journal of Rock Mechanics and Mining Sciences*, vol. 45, 2008. pp. 879-887, available at: www.sciencedirect.com.

Xu, Zhiyue et al., "Laser Spallation of Rocks for Oil Well Drilling", *Proceedings of the 23rd International Congress on Applications of Lasers and Electro-Optics*, 2004, pp. 1-6.

Xu, Z et al. "Modeling of Laser Spallation Drilling of Rocks fro gas- and Oilwell Drilling", *Society of Petroleum Engineers*, SPE 95746, 2005, pp. 1-6.

Xu, Z. et al., "Specific Energy for Laser Removal of Rocks", *Proceedings of the 20th International Congress on Applications of Lasers & Electro-Optics*, 2001, pp. 1-8.

(56) References Cited

OTHER PUBLICATIONS

Xu, Z. et al., "Specific energy for pulsed laser rock drilling", *Journal of Laser Applications*, vol. 15, No. 1, 2003, pp. 25-30.

Yamshchikov, V. S. et al., "An Evaluation of the Microcrack Density of Rocks by Ultrasonic Velocimetric Method", believed to be published by Moscow Mining Institute. (Translated from Fiziko-Tekhnicheskie Problemy Razrabotki Poleznykh Iskopaemykh), 1985, pp. 363-366.

Yilbas, B. S. et al., "Laser short pulse heating: Influence of pulse intensity on temperature and stress fields", *Applied Surface Science*, vol. 252, 2006, pp. 8428-8437.

Yilbas, B. S. et al., "Laser treatment of aluminum surface: Analysis of thermal stress field in the irradiated región", *Journal of Materials Processing Technology*, vol. 209, 2009, pp. 77-88.

Yilbas, B. S. et al., "Nano-second laser pulse heating and assisting gas jet considerations", *International Journal of Machine Tools & Manufacture*, vol. 40, 2000, pp. 1023-1038.

Yilbas, B. S. et al., "Repetitive laser pulse heating with a convective boundary condition at the surface", *Journal of Physics D: Applied Physics*, vol. 34, 2001, pp. 222-231.

Yun, Yingwei et al., "Thermal Stress Distribution in Thick Wall Cylinder Under Thermal Shock", *Journal of Pressure Vessel Technology*, Transactions of the ASMA, 2009, vol. 131, pp. 1-6.

Zeuch, D.H. et al., "Rock Breakage Mechanism Wirt a PDC Cutter", *Society of Petroleum Engineers, 60$^{th}$ Annual Technical Conference*, Las Vegas, Sep. 22-25, 1985, 11 pgs.

Zhai, Yue et al., "Dynamic failure analysis on granite under uniaxial impact compressive load", *Front. Archit. Civ. Eng. China*, vol. 2, No. 3, 2008, pp. 253-260.

Zhou, X.P., "Microcrack Interaction Brittle Rock Subjected to Uniaxial Tensile Loads", *Theoretical and Applied Fracture Mechanics*, vol. 47, 2007, pp. 68-76.

Zhou, Zehua et al., "A New Thermal-Shock-Resistance Model for Ceramics: Establishment and validation", *Materials Science and Engineering*, A 405, 2005, pp. 272-276.

Zhu, Dongming et al., "Influence of High Cycle Thermal Loads on Thermal Fatigue Behavior of Thick Thermal Barrier Coatings", believed to be published by *National Aeronautics and Space Administration, Army Research Laboratory*, Technical Report ARL-TR-1341, NASA TP-3676, 1997, pp. 1-50.

Zhu, Dongming et al., "Investigation of thermal fatigue behavior of thermal barrier coating systems", *Surface and Coatings Technology*, vol. 94-95, 1997, pp. 94-101.

Zhu, Dongming et al., "Investigation of Thermal High Cycle and Low Cycle Fatigue Mechanisms of Thick Thermal Barrier Coatings", believed to be published by *National Aeronautics and Space Administration, Lewis Research Center*, NASA/TM-1998-206633, 1998, pp. 1-31.

Zhu, Dongming et al., "Thermophysical and Thermomechanical Properties of Thermal Barrier Coating Systems", believed to be published by *National Aeronautics and Space Administration, Glenn Research Center*, NASA/TM-2000-210237, 2000, pp. 1-22.

Author unknown, "A Built-for-Purpose Coiled Tubing Rig", believed to be published by Schulumberger Wells,No. DE-PS26-03NT15474, 2006, p. 18.

Author unknown, "Diamond-Cutter Drill Bits", believed to be published by Geothermal Energy Program, Office of Geothermal and Wind Technologies, 2000, 2 pages.

Author unknown, "Introducing the XTC200DTR Plus", believed to be published by Extreme Drilling Corporation, 2009, 10 pages.

Author unknown, "IADC Dull Grading System for Fixed Cutter Bits", believed to be published by Hughes Christensen, 1996, 14 pages.

Author unknown, "Percussion Drilling Manual Impax™ Hammer Bit", by Smith Tool, 2002, 67 pages.

Author unknown, "Simple Drilling Methods", believed to be published by WEDC Loughborough University, United Kingdom, 1995, pp. 41-44.

Author unknown, "Capital Drilling Equipment Brochure", believed to be published by GE Oil & Gas Business, 2008, 15 pages.

Chastain, T. et al., "Deep Water Drilling System", *SPE Drilling Engineering*, Aug. 1986, pp. 325-328.

Author unknown, "Drilling Systems: Reliable to the Extremes", believed to be published by GE Oil & Gas (Drilling & Production) Brochure, 2009, 15 pages.

Author unknown, "Forensic Examination of Deepwater Horizon Blowout Preventer", a DNV (Det Norske Veritas) report for US Department of the Interior, Bureau of Ocean Energy Management, Regulation, and Enforcement, Mar. 20, 2011, 200 pages.

Author unknown, "Mini Shear Study", a West Engineering Services, Inc. Case Study for U.S. Minerals Management Services, Dec. 2002, pp. 1-16.

Author unknown, "Shear Ram Blowout Preventer Forces Required", believed to be published by Barringer and Associates, Inc., 2010, 17 pages.

Author unknown, "Shear Ram Capabilities Study", a West Engineering Services Study for US Minerals Management Services, Sep. 2004, 61 pages.

\* cited by examiner

LASER ASSISTED RISER DISCONNECT AND METHOD OF USE

BACKGROUND OF THE INVENTION

1. Field of the Invention

The present inventions relate to risers that are used for offshore exploration and production of hydrocarbons, such as oil and natural gas. Thus, and in particular, the present inventions relate to novel laser modules for use with risers to quickly disconnect the riser from either an offshore drilling rig, a subsea blowout preventer or both.

As used herein, unless specified otherwise the terms "blowout preventer," "BOP," and "BOP stack" are to be given their broadest possible meaning, and include: (i) devices positioned at or near the borehole surface, e.g., the seafloor, which are used to contain or manage pressures or flows associated with a borehole; (ii) devices for containing or managing pressures or flows in a borehole that are associated with a subsea riser; (iii) devices having any number and combination of gates, valves or elastomeric packers for controlling or managing borehole pressures or flows; (iv) a subsea BOP stack, which stack could contain, for example, ram shears, pipe rams, blind rams and annular preventers; and, (v) other such similar combinations and assemblies of flow and pressure management devices to control borehole pressures, flows or both and, in particular, to control or manage emergency flow or pressure situations.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring. As used herein, unless specified otherwise the terms "well" and "borehole" are to be given their broadest possible meaning and include any hole that is bored or otherwise made into the earth's surface, e.g., the seafloor or sea bed, and would further include exploratory, production, abandoned, reentered, reworked, and injection wells. As used herein the term "riser" is to be given its broadest possible meaning and would include any tubular that connects a platform at, on, or above the surface of a body of water, including an offshore drilling rig, a floating production storage and offloading (FPSO) vessel, and a floating gas storage and offloading (FGSO) vessel, to a structure at, on, or near the seafloor for the purposes of activities such as drilling, production, workover, service, well service, intervention and completion.

As used herein the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms are to be given their broadest possible meaning and include two, three or four sections of drill pipe that have been connected, e.g., joined together, typically by joints having threaded connections. As used herein the terms "drill string," "string," "string of drill pipe," string of pipe" and similar type terms are to be given their broadest definition and would include a stand or stands joined together for the purpose of being employed in a borehole. Thus, a drill string could include many stands and many hundreds of sections of drill pipe.

As used herein the term "tubular" is to be given its broadest possible meaning and includes drill pipe, casing, riser, coiled tube, composite tube, production tubing, vacuum insulated tubing (VIT) and any similar structures having at least one channel therein that are, or could be used, in the drilling industry. As used herein the term "joint" is to be given its broadest possible meaning and includes all types of devices, systems, methods, structures and components used to connect tubulars together, such as for example, threaded pipe joints and bolted flanges. For drill pipe joints, the joint section typically has a thicker wall than the rest of the drill pipe. As used herein the thickness of the wall of a tubular is the thickness of the material between the internal diameter of the tubular and the external diameter of the tubular.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

2. Discussion of Related Art

Deep Water Drilling

Offshore hydrocarbon exploration and production has been moving to deeper and deeper waters. Today drilling activities at depths of 5000 ft, 10,000 ft and even greater depths are contemplated and carried out. For example, its has been reported by RIGZONE, www.rigzone.com, that there are over 330 rigs rated for drilling in water depths greater than 600 ft (feet), and of those rigs there are over 190 rigs rated for drilling in water depths greater than 5,000 ft, and of those rigs over 90 of them are rated for drilling in water depths of 10,000 ft. When drilling at these deep, very-deep and ultra-deep depths the drilling equipment is subject to the extreme conditions found in the depths of the ocean, including great pressures and low temperatures at the seafloor.

Further, these deep water drilling rigs are capable of advancing boreholes that can be 10,000 ft, 20,000 ft, 30,000 ft and even deeper below the seafloor. As such, the drilling equipment, such as drill pipe, casing, risers, and the BOP are subject to substantial forces and extreme conditions. To address these forces and conditions drilling equipment, for example, risers, drill pipe and drill strings, are designed to be stronger, more rugged, and in may cases heavier. Additionally, the metals that are used to make drill pipe and casing have become more ductile.

Typically, and by way of general illustration, in drilling a subsea well an initial borehole is made into the seabed and then subsequent and smaller diameter boreholes are drilled to extend the overall depth of the borehole. Thus, as the overall borehole gets deeper its diameter becomes smaller; resulting in what can be envisioned as a telescoping assembly of holes with the largest diameter hole being at the top of the borehole closest to the surface of the earth.

Thus, by way of example, the starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity, are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP is then secured to a riser and lowered by the riser to the sea floor; where the BOP is secured to the wellhead. From this point forward, in general, all drilling activity in the borehole takes place through the riser and the BOP.

The BOP, along with other equipment and procedures, is used to control and manage pressures and flows in a well. In general, a BOP is a stack of several mechanical devices that have a connected inner cavity extending through these devices. BOP's can have cavities, e.g., bore diameters ranging from about 4⅛" to 26¾." Tubulars are advanced from the offshore drilling rig down the riser, through the BOP cavity and into the borehole. Returns, e.g., drilling mud and cuttings, are removed from the borehole and transmitted through the BOP cavity, up the riser, and to the offshore drilling rig. The BOP stack typically has an annular preventer, which is an expandable packer that functions like a giant sphincter muscle around a tubular. Some annular preventers may also be used or capable of sealing off the cavity when a tubular is not present. When activated, this packer seals against a tubular that is in the BOP cavity, preventing material from flowing through the annulus formed between the outside diameter of the tubular and the wall of the BOP cavity. The BOP stack also typically has ram preventers. As used herein unless specified otherwise, the term "ram preventer" is to be given its broadest definition and would include any mechanical devices that clamp, grab, hold, cut, sever, crush, or combinations thereof, a tubular within a BOP stack, such as shear rams, blind rams, blind-shear rams, pipe rams, variable rams, variable pipe rams, casing shear rams, and preventers such as Hydril's HYDRIL PRESSURE CONTROL COMPACT Ram, Hydril Pressure Control Conventional Ram, HYDRIL PRESSURE CONTROL QUICK-LOG, and HYDRIL PRESSURE CONTROL SENTRY Workover, SHAFFER ram preventers, and ram preventers made by Cameron.

Thus, the BOP stack typically has a pipe ram preventer and my have more than one of these. Pipe ram preventers typically are two half-circle like clamping devices that are driven against the outside diameter of a tubular that is in the BOP cavity. Pipe ram preventers can be viewed as two giant hands that clamp against the tubular and seal-off the annulus between the tubular and the BOP cavity wall. Blind ram preventers may also be contained in the BOP stack, these rams can seal the cavity when no tubulars are present.

Pipe ram preventers and annular preventers typically can only seal the annulus between a tubular in the BOP and the BOP cavity; they cannot seal-off the tubular. Thus, in emergency situations, e.g., when a "kick" (a sudden influx of gas, fluid, or pressure into the borehole) occurs, or if a potential blowout situations arises, flows from high downhole pressures can come back up through the inside of the tubular, the annulus between the tubular and riser, and up the riser to the drilling rig. Additionally, in emergency situations, the pipe ram and annular preventers may not be able to form a strong enough seal around the tubular to prevent flow through the annulus between the tubular and the BOP cavity. Thus, BOP stacks include a mechanical shear ram assembly. Mechanical shear rams are typically the last line of defense for emergency situations, e.g., kicks or potential blowouts. (As used herein, unless specified otherwise, the term "shear ram" would include blind shear rams, shear sealing rams, shear seal rams, shear rams and any ram that is intended to, or capable of, cutting or shearing a tubular.) Mechanical shear rams function like giant gate valves that are supposed to quickly close across the BOP cavity to seal it. They are intended to cut through any tubular in the BOP cavity that could potentially block the shear ram from completely sealing the BOP cavity.

BOP stacks can have many varied configurations, which are dependent upon the conditions and hazards that are expected during deployment and use. These components could include, for example, an annular type preventer, a rotating head, a single ram preventer with one set of rams (blind or pipe), a double ram preventer having two sets of rams, a triple ram type preventer having three sets of rams, and a spool with side outlet connections for choke and kill lines. Examples of existing configurations of these components could be: a BOP stack having a bore of 7 1/16" and from bottom to top a single ram, a spool, a single ram, a single ram and an annular preventer and having a rated working pressure of 5,000 psi; a BOP stack having a bore of 13⅝" and from bottom to top a spool, a single ram, a single ram, a single ram and an annular preventer and having a rated working pressure of 10,000 psi; and, a BOP stack having a bore of 18¾" and from bottom to top, a single ram, a single ram, a single ram, a single ram, an annular preventer and an annular preventer and having a rated working pressure of 15,000 psi.

BOPs need to contain the pressures that could be present in a well, which pressures could be as great as 15,000 psi or greater. Additionally, there is a need for shear rams that are capable of quickly and reliably cutting through any tubular, including drilling collars, pipe joints, and bottom hole assemblies that might be present in the BOP when an emergency situation arises or other situation where it is desirable to cut tubulars in the BOP and seal the well. With the increasing strength, thickness and ductility of tubulars, and in particular tubulars of deep, very-deep and ultra-deep water drilling, there has been an ever increasing need for stronger, more powerful, and better shear rams. This long standing need for such shear rams, as well as, other information about the physics and engineering principles underlying existing mechanical shear rams, is set forth in: West Engineering Services, Inc., "Mini Shear Study for U.S. Minerals Management Services" (Requisition No. 2-1011-1003, December 2002); West Engineering Services, Inc., "Shear Ram Capabilities Study for U.S. Minerals Management Services" (Requisition No. 3-4025-1001, September 2004); and, Barringer & Associates Inc., "Shear Ram Blowout Preventer Forces Required" (Jun. 6, 2010, revised Aug. 8, 2010).

In an attempt to meet these ongoing and increasingly important needs, BOPs have become larger, heavier and more complicated. Thus, BOP stacks having two annular preventers, two shear rams, and six pipe rams have been suggested. These BOPs can weigh many hundreds of tons and stand 50 feet tall, or taller. The ever-increasing size and weight of BOPs presents significant problems, however, for older drilling rigs. Many of the existing offshore rigs do not have the deck space, lifting capacity, or for other reasons, the ability to handle and use these larger more complicated BOP stacks.

As used herein the term "riser" is to be given its broadest possible meaning and would include any tubular that connects a platform at, on or above the surface of a body of water, including an offshore drilling rig, a floating production storage and offloading ("FPSO") vessel, and a floating gas storage and offloading ("FGSO") vessel, to a structure at, on, or near the seafloor for the purposes of activities such as drilling, production, workover, service, well service, intervention and completion.

Risers, which would include marine risers, subsea risers, and drilling risers, are essentially large tubulars that connect an offshore drilling rig, vessel or platform to a borehole. Typically a riser is connected to the rig above the water level and to a BOP on the seafloor. Risers can be viewed as essentially a very large pipe, that has an inner cavity through which the tools and materials needed to drill a well are sent down from the offshore drilling rig to the borehole in the seafloor and waste material and tools are brought out of the borehole and back up to the offshore drilling rig. Thus, the riser functions like an umbilical cord connecting the offshore rig to the wellbore through potentially many thousands of feet of water.

Risers can vary in size, type and configuration. All risers have a large central or center tube that can have an outer diameters ranging from about 13⅜" to about 24" and can have wall thickness from about ⅝" to ⅞" or greater. Risers come in sections that can range in length from about 49 feet to about 82 feet, and typically for ultra deep water applications, are about 75 feet long. Thus, to have a riser extend from the rig to a BOP on the seafloor the rise sections are connected together by the rig and lowered to the seafloor.

The ends of each riser section have riser couplings that enable the large central tube of the riser sections to be connected together. The term "riser coupling" should be given its broadest possible meaning and includes various types of coupling that use mechanical means, such as, flanges, bolts, clips, bowen, lubricated, dogs, keys, threads, pins and other means of attachment known to the art or later developed by the art. Thus, by way of example riser couplings would include flange-style couplings, which use flanges and bolts; dog-style couplings, which use dogs in a box that are driven into engagement by an actuating screw; and key-style couplings, which use a key mechanism that rotates into locking engagement. An example of a flange-style coupling would be the VetcoGray HMF. An example of a dog-style coupling would be the VetcoGray MR-10E. An example of a key-style coupling would be the VetcoGray MR-6H SE Each riser section also has external pipes associated with the large central tube. These pipes are attached to the outside of the large central tube, run down the length of the tube or riser section, and have their own connections that are associated with riser section connections. Typically, these pipes would include a choke line, kill line, booster line, hydraulic line and potentially other types of lines or cables. The choke, kill, booster and hydraulic lines can have inner diameters from about 3" (hydraulic lines may be as small as about 2.5") to about 6.5" or more and wall thicknesses from about ½" to about 1" or more.

Situations arise where it may be necessary to disconnect the riser from the offshore drilling rig, vessel or platform. In some of these situations, e.g., drive-off of a floating rig, there may be little or no time, to properly disconnect the riser. In others situations, such as weather related situations, there may be insufficient time to pull the riser string once sufficient weather information is obtained; thus forcing a decision to potentially unnecessarily pull the riser. Thus, and particularly for deep, very deep and ultra deep water drilling there has existed a need to be able to quickly and with minimal damage disconnect a riser from an offshore drilling rig, a BOP or both.

High Power Laser Beam Conveyance

Prior to the recent breakthroughs of co-inventor Dr. Mark Zediker and those working with him at Foro Energy, Inc., Littleton Colo., it was believed that the transmission of high power laser energy over great distances without substantial loss of power was unobtainable. Their breakthroughs in the transmission of high power laser energy, and in particular energy levels greater than about 5 kW, are set forth, in part, in the novel and innovative teachings contained in US patent application publications 2010/0044106 and 2010/0215326 and in Rinzler et. al, pending U.S. patent application Ser. No. 12/840,978 titled "Optical Fiber Configurations for Transmission of Laser Energy Over Great Distances" (filed Jul. 21, 2010). The disclosures of these three US patent applications, to the extent that they refer or relate to the transmission of high power laser energy, and lasers, fibers and cable structures for accomplishing such transmissions, are incorporated herein by reference. It is to be noted that this incorporation by reference herein does not provide any right to practice or use the inventions of these applications or any patents that may issue therefrom and does not grant, or give rise to, any licenses thereunder.

The utilization and application of high power lasers to BOPs and risers is set forth in U.S. patent application Ser. Nos. having 13/034,175, 13/034,183 and 13/034,037 filed concurrently herewith, the entire disclosures of which are incorporated herein by reference.

SUMMARY

In offshore drilling operations it has long been desirable to have the ability disconnect the riser giving the offshore drilling rig the ability to move away from the drilling location. The present invention, among other things, solves this need by providing the articles of manufacture, devices and processes taught herein.

Thus, there is provided herein a laser-riser blowout preventer package for operably releasably associating an offshore drilling rig, a vessel or a platform on a surface of a body of water with a borehole in a seafloor of the body of water, the laser-riser blowout preventer package having: a riser section having a first end and a second end, wherein the first end has a first coupling and the second end has a second coupling; a laser module operably associated with the riser section; and, a blowout preventer configured to be operably associated with the riser section and the borehole; wherein, when the laser-riser blowout preventer package is deployed and operably associating the offshore drilling rig with the borehole in the seafloor, the laser module upon firing a laser beam can completely cut the riser section at a predetermined location on the riser section, thereby releasing the offshore drilling rig from the blowout preventer.

Still further, there is provided a laser-riser blowout preventer package wherein the first coupling is selected from the group consisting of: a dog-style riser coupling, a flange-style riser coupling a key-style riser coupling, clip connector, a bowen connector, and a threaded connecter. wherein the second coupling is selected from the group consisting of: a dog-style riser coupling, a flange-style riser coupling, a key-style riser coupling, clip connector, a bowen connector, and a threaded connecter. wherein the second coupling is a blowout preventer connector, or wherein the blowout preventer connector is hydraulic.

Additionally, there is provided a laser-riser blowout preventer package, wherein the laser module has a laser cutter for emitting a laser beam defining a beam path in which the beam path is directed toward the first coupling, wherein the laser module has a laser cutter for emitting a laser beam defining a beam path, wherein the beam path is directed toward the second coupling, wherein the laser module has a laser cutter for emitting a laser beam defining a beam path in which the beam path is directed toward the first coupling, and/or wherein the laser module has a laser cutter for emitting a laser beam defining a beam path in which the beam path is directed toward the second coupling.

Still further, there is provided a laser-riser blowout preventer package in which the laser module is adjacent the first coupling, the laser module is adjacent the second coupling, or the laser module has at least two laser cutters.

Moreover, there is provided a laser-riser blowout preventer package having at least 10 riser sections, the package has at least 30 riser sections, the package has at least 60 riser sections, or the package has at least 100 riser sections.

There is further provided a laser-riser blowout preventer package including: a riser section, wherein the riser section has a first means for coupling and a second means for coupling; a means for providing a laser beam to cut a component of the riser section; and a blowout preventer.

Yet further, there is provided a laser-riser blowout preventer package, wherein the means for providing a laser beam is a laser cutter for emitting a laser beam having a beam path, wherein the beam path is directed toward the second means for coupling; wherein the means for providing a laser beam is a laser cutter for emitting a laser beam having a beam path, wherein the beam path is directed toward the first means for coupling; or wherein the means for providing a laser beam may be a laser cutter for emitting a laser beam having a beam path, wherein the beam path is directed toward a means for connecting.

Additionally, there is provided a laser-riser blowout preventer package wherein the means for providing a laser beam is a laser cutter for emitting a laser beam having a beam path, wherein the beam path is directed toward the first means for coupling; wherein the means for providing a laser beam is a laser cutter for emitting a laser beam having a beam path, wherein the beam path is directed toward the second means for connecting; wherein the means for providing a laser beam comprises a laser cutter for emitting a laser beam having a beam path, wherein the beam path is directed toward the first means for connecting; or wherein the means for providing a laser beam is a laser cutter for emitting a laser beam having a beam path, wherein the beam path is directed toward the second means for connectiStill further, there is provided a laser module for use with a marine riser, the laser module having: a housing configured for association with a marine riser, the housing defining an inner area, whereby at least a portion of the marine riser may be contained within the inner area; the housing having a first laser cutter and a second laser cutter; the first and second laser cutters, being positioned within the housing and the first and second laser cutters each having a laser discharge end; and a beam path extending from the laser discharge end to the inner area of the housing. Moreover, the housing can be an annular housing with the inner area including an annular portion of the housing and wherein the marine riser has a center tube, an external pipe, and a first coupling, and wherein the annular housing is configured to accommodate the center tube, the external pipes and the coupling.

Additionally, there is provided a quick release riser section having: a riser section, including a first end having a first coupling, a second end having a second coupling and a center tube; a laser cutter; and, a beam path extending between the laser cutter and the riser section.

Further, there is provided an offshore drilling rig system including an offshore drilling rig and a quick release riser blowout preventer package, the package having: a riser comprising a plurality of riser sections, wherein the plurality of sections are configured for being lowered from and operably connected to the offshore drilling rig to a depth at or near a seafloor; a blowout preventer configured for being operably connected to the riser and lowered by the riser from the offshore drilling rig to the seafloor; and, the riser having a laser module; the laser module including a laser cutter for emitting a laser beam defining a beam path, wherein the beam path is directed from the laser cutter toward one of the plurality of riser sections; wherein, when the package is deployed and operably associating the offshore drilling rig with a borehole in the seafloor, the laser module upon firing a laser beam can cut at least a portion of the one of the plurality of riser sections at a predetermined location, thereby providing for the quick release of the offshore drilling rig from the blowout preventer.

A method of drilling subsea wells by using a laser module associated with a riser section, the method including: lowering a blowout preventer from an offshore drilling rig to the seafloor using a riser including a plurality of riser sections, wherein the blowout preventer includes a blowout preventer cavity defined by the blowout preventer, the riser includes a riser cavity defined by the riser; one of the plurality of the riser sections having a laser module associated therewith, wherein the laser module includes a laser cutter for emitting a laser beam that defines a beam path and wherein the beam path is directed from the laser cutter toward a component of the one of the plurality of riser sections; securing the blowout preventer to a borehole defining a borehole cavity, whereby the borehole cavity, the blowout preventer cavity and the riser cavity are in fluid and mechanical communication; and, advancing the borehole by lowering tubulars from the offshore drilling rig down through the riser cavity, the blowout preventer cavity and into the borehole; whereby, a drilling operation is enhanced by having an ability in an emergency situation to fire a laser beam from the laser module to completely cut the component of the one of the plurality of riser sections in the beam path, thereby weakening the riser and providing a controlled disconnection of the offshore drilling rig from the borehole.

Still further, there is provided a method of performing drilling, workover, intervention, completion or service activities on a subsea well by using a laser module associated with a riser section, the method including: positioning a riser between the surface of a body of water and a seafloor, the riser including a riser cavity defined by the riser, wherein the riser is in fluid communication with a subsea well and an offshore rig, vessel or platform; associating a laser module with the riser, wherein the laser module comprises a laser cutter for emitting a laser beam that defines a beam path and wherein the beam path is directed from the laser cutter toward a component of the riser; and, performing activities on the well by advancing structures through the riser cavity; thereby providing the capability to fire a laser beam from the laser module to completely cut the riser in the beam path, thereby weakening the riser and providing a controlled disconnection of the riser.

DESCRIPTION OF THE PREFERRED EMBODIMENTS

Figure 1:
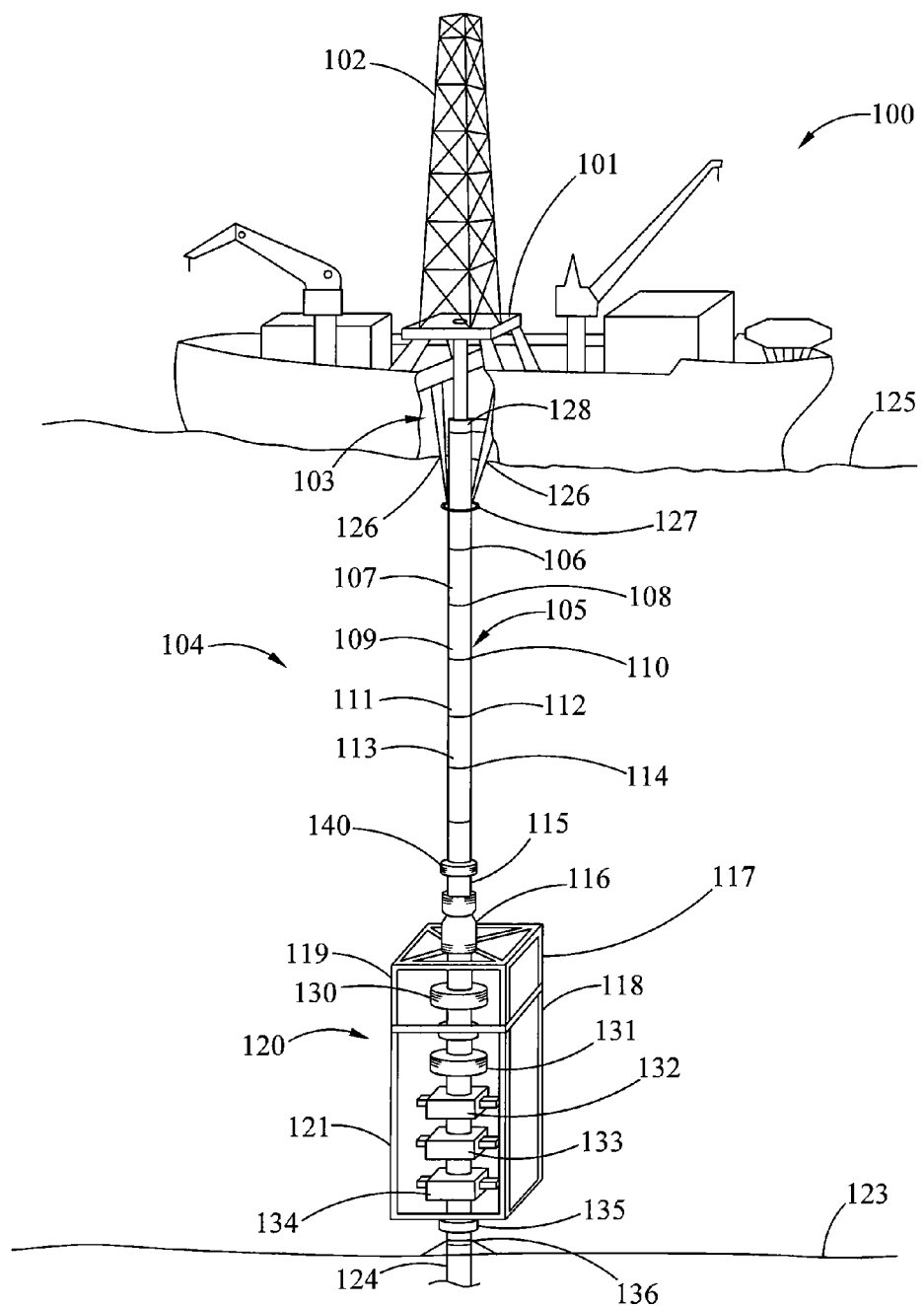
FIG. 1 is a perspective view of an embodiment of a laser-riser BOP package of the present invention.

In general, the present inventions relate to laser assemblies such as laser modules for risers having high power laser beam cutters, laser riser sections, and laser-riser BOP packages utilizing such modules and sections. Thus, by way of example, an embodiment of a laser-riser BOP package having laser modules is schematically shown in FIG. 1. In this embodiment there is provided a dynamically positioned (DP) drill ship 100 having a drill floor 101, a derrick 102 above the drill floor, and moon pool 103 (as seen by the cutaway in the figure showing the interior of the drill ship 100) below the drill floor 101 and other drilling and drilling support equipment and devices utilized for operation, which are known to the offshore drilling arts, but are not shown in the figure. The drill ship includes a laser-riser BOP package 104. Although a drill ship is shown in this embodiment, any other type of offshore drilling rig, vessel or platform including FPSOs, or GGSOs, may be utilized and thus may include a laser-riser BOP package 104. The laser-riser BOP package 104, as shown in this figure, is deployed and connecting drill ship 100 with a borehole 124 that extends below the seafloor 123.

In FIG. 1 the laser-riser BOP package is configured along the lines of a drilling riser BOP package with the BOP positioned at or near the seafloor, typically attached to a wellhead, as seen for example in some drilling activities. The present laser modules, laser cutters laser assemblies and laser-riser assemblies of the present inventions have applications to other types of risers, riser-BOP packages and activities. Thus, they have applications in relation to drilling, workover, servicing, testing, intervention and completing activities. They also have applications to surface BOPs, e.g., where BOP is positioned above the surface of the water and the riser extends from the BOP to the seafloor, where a BOP is not employed, were drilling is done in the riser, where the riser is a production riser, and other configurations known to or later developed by the art.

The laser-riser BOP package 104 has a riser 105 and a BOP stack 120. The upper portion, i.e., the portion of the riser when deployed that is closest to the surface of the water 125, of riser 105, is connected to the drillship 100 by tensioners 126 that are attached to tension ring 127. The upper section of the riser 105 may have a diverter 128 and other components (not shown in this figure) that are commonly utilized and employed with risers and are well known to those of skill in the art of offshore drilling.

The riser 105 extends from the moon pool 103 of drill ship 100 and is connected to BOP stack 120. The riser 105 is made up of riser sections, e.g., 107, 109, 111, 113, that are connected together, by riser couplings, e.g., 106, 108, 110, 112, 114, and lowered through the moon pool 103 of the drill ship 100. Thus, the riser 105 may also be referred to as a riser string. The lower portion, i.e., the portion of the riser that when deployed is closest to the seafloor, of the riser 105 is connected to the BOP stack 120 by way of the riser-BOP connecter 115. The riser-BOP connecter 115 is associated with flex joint 116, which may also be referred to as a flex connection or ball joint. The flex joint 116 is intended to accommodate movements of the drill ship 100 from positions that are not directly above the laser assisted BOP stack 120; and thus accommodate the riser 105 coming into the BOP stack 120 at an angle.

The laser riser BOP package 104 has a laser module 140 that is associated with the riser 105 near a connection (not shown because of the module 140). The laser module 140 can quickly cut material, by delivering high power laser energy in the form of a laser beam along a beam path to riser components, such as bolts, dogs, the riser central tube, or other structures or components to enable the riser to be quickly removed from the BOP 120. As set forth in the various exemplary embodiments of this specification, laser modules, such as laser module 140, have one laser cutter, two laser cutters or may have several laser cutters. The laser cutters can rotate, move, be stationary or combinations thereof. The laser modules may be located at any point along the riser, from the moon pool to the seafloor, where it would be desirable to have a quick disconnect like feature in the riser. Thus, it could be envisioned that laser modules are located just below the tension ring 127, just above the flex joint 116 and at points along the riser string 105, and combinations of the foregoing. The laser module may be an integral part of a riser section, a riser coupling, it may be its own separate riser section, or it may be an assembly that is added on to the riser after the riser sections have been connected together. Thus, one, two, three or several laser modules may be utilized in a laser-riser BOP package.

The BOP stack may be characterized as having two component assemblies: an upper component assembly 117, which may be referred to as the lower marine riser package (LMRP), and a lower component assembly 118, which may be referred to as the lower BOP stack or the BOP proper. In this embodiment, the upper component assembly 117 has a frame 119 that houses an annular preventer 130. The lower component assembly 118 has a frame 121 that houses an annular preventer 131, a first ram preventer 132, a second ram preventer 133, and a third ram preventer 134. Although not shown the BOP stack could also contain a shear laser module ("SLM"), a laser shear ram assembly or both. The BOP stack 120 has a wellhead connecter 135 that attaches to wellhead 136, which is associated with borehole 124.

The riser has an internal cavity, not shown in FIG. 1 that is in fluid and mechanical communication with an internal cavity, not shown in FIG. 1, in the BOP stack. Thus, as deployed, the laser riser BOP package 104 provides a cavity or channel putting the drill ship 100 in fluid and mechanical communication with the borehole. The BOP stack frames 119, 121 protect the BOP, and may have lifting and handling devices, a control and connection module, and other equipment and devices utilized in subsea operation, which are known to the offshore drilling art, but are not shown in the figure. The internal cavity in the stack goes through the stack from its top (closest to the surface of the water 125) to its bottom (closest to the sea floor 123). This cavity, for example, could be about 18¾" in diameter and has a cavity wall.

Typically, in deep sea drilling operations a 21" riser and an 18¾" BOP are used. The term "21" riser" can be considered as generic and covers risers wherein the large central tube has an outer diameter in the general range of 21" and would include for example a riser having a 21¼" outer diameter. Wall thickness for the central tube of 21" risers can range from about ⅝" to ⅞" or greater. Risers and BOPs, however, can vary in size, type and configuration. Risers can have outer diameters ranging from about 13⅜" to about 24." Risers may be, for example, conventional pipe risers, flexible pipe risers, composite tube structures, steel cantenary risers ("SCR"), top tensioned risers, hybrid risers, and other types of risers known to those skilled in the offshore drilling arts or later developed. The use of smaller and larger diameter risers, different types and configurations of risers, BOPs having smaller and larger diameter cavities, and different types and configurations of BOPs, are contemplated; and, the teachings and inventions of this specification are not limited to, or by, the size, type or configuration of a particular riser or BOP.

During deployment the BOP stack 120 is attached to the riser 105, lowered to the seafloor 123 and secured to a wellhead 136. The wellhead 136 is positioned and fixed to a casing (not shown), which has been cemented into a borehole 124. From this point forward, generally, all the drilling activity in the borehole takes place through the riser and the BOP. Such drilling activity would include, for example, lowering a string of drill pipe having a drill bit at its end from the drill ship 100 down the internal cavity of the riser, through the cavity of the BOP stack 120 and into the borehole 124. Thus, the drill string would run from the drill ship 100 on the surface of the water 125 to the bottom of the borehole, potentially many tens of thousands of feet below the water surface 125 and seafloor 123. The drill bit would be rotated against the bottom of the borehole, while drilling mud is pumped down the interior of the drill pipe and out the drill bit. The drilling mud would carry the cuttings, e.g., borehole material removed by the rotating bit, up the annulus between the borehole wall and the outer diameter of the drill string, continuing up through the annulus between BOP cavity wall and the outer diameter of the drill string, and continuing up through the annulus between the inner diameter of the riser cavity and the outer diameter of the drill string, until the drilling mud and cuttings are directed, generally by a bell housing (not shown), or in extreme situations a diverter 128, to the drill ship 100 for handling or processing. Thus, the drilling mud is pumped from the drill ship 100 through a drill string in the riser to the bottom of the borehole and returned to the drill ship, in part, by the laser-riser BOP package 104.

The sections of the riser are typically stored vertically on the offshore drilling rig. Once the drilling rig has reached a drilling location the riser and BOP package are deployed to the seafloor. In general, it being recognized that different, varied and more detailed procedures may be followed, as a first step in deploying the BOP, the BOP stack is prepared and positioned under the drill floor and under the rotary table. A spider and gimbal are also positioned with respect to the rotary table. The lower most section of the riser that attaches to the BOP is moved into the derrick and lowered by the hoisting apparatus in the derrick through the spider and down to the BOP below the drill floor where it is connected to the BOP. The riser and BOP are then lowered to a point where the upper coupling of the riser section is at a height above the drill floor were it can be readily connected to the next section of riser. The spider holds the riser in this position. Once the connection has been made, the two sections and the BOP are then lowered, and this process is repeated until sufficient sections of riser have been added and lowered to enable the BOP to reach and be landed on (attached to) the wellhead at the seafloor.

During this process, laser modules can be attached to the riser either below the drill floor, if they are too larger to fit through the spider, or above the drill floor if they can fit through the spider. Additionally, if the laser module is integral with a riser section or incorporated into a riser section, that section can be added into the riser as one of the riser sections used to lower the BOP to the seafloor.

Laser-riser BOP packages, may utilize a single high power laser, and preferably may have two or three high power lasers, and may have several high power lasers, for example, six or more. High power solid-state lasers, specifically semiconductor lasers and fiber lasers are preferred, because of their short start up time and essentially instant-on capabilities. The high power lasers for example may be fiber lasers or semiconductor lasers having 10 kW, 20 kW, 50 kW or more power and, which emit laser beams with wavelengths preferably in about the 1550 nm (nanometer), or 1083 nm ranges. Examples of preferred lasers, and in particular solid-state lasers, such as fibers lasers, are set forth in US patent application publications 2010/0044106 and 2010/0215326 and in pending U.S. patent application Ser. No. 12/840,978. The laser, or lasers, may be located on the offshore drilling rig, above the surface of the water, and optically connected to laser modules on the riser by way of a high power long distance laser transmission cable, preferred examples of which are set forth in US patent application publications 2010/0044106 and 2010/0215326 and in pending U.S. patent application Ser. No. 12/840,978. The laser transmission cable may be contained on a spool and unwound and attached to the riser sections as they are lowered to the seafloor. The laser, or lasers, may also be contained in, or associated with, the BOP frame, and have optical cables running from the BOP frame up the riser to the laser module located on the riser. Thus, potentially eliminating the need for a long distance of high power optical cable to transmit the laser beam from the surface of the water down to the seafloor. In view of the extreme conditions in which the laser modules are required to operate and the need for high reliability in their operation, one such configuration of a laser-riser BOP package is to have at least one high power laser located on the offshore drilling rig and connected to the laser module by a high power transmission cable and to have at least one laser in, or associated with, the BOP frame on the seafloor and connected to the laser module by a high power transmission cable.

In FIGS. 2A-C, 3A-B, 4A-B, 5A-B, and 6A-B there are shown exemplary embodiments of laser modules associated with a riser having a flanged coupling, such as an HMF coupling. Although a flanged coupling is shown for illustrative purposes, the teachings and scope of protect would cover all types of riser connections, including various types of couplings that use mechanical means, such as, flanges, bolts, clips, bowen, lubricated, dogs, keys, threads, course threads, pins and other means of attachment known to the art or later developed by the art. Thus, by way of example, riser couplings would include flange-style couplings, which use flanges and bolts; dog-style, which use dogs in a box that are driven into engagement by an actuating screw; and key-style, which use a key mechanism that rotates into locking engagement. An example of a flange-style coupling would be the VetcoGray HMF. An example of a dog-style coupling would be the VetcoGray MR-10E. An example of a key-style coupling would be the VetcoGray MR-6H SE. The laser energy would preferably be directed to the area or areas in the coupling where the connecting forces were critical, where the material was thinnest, where important structural features were available to a beam path, or combinations of these areas ands.

In the "A" figures there is shown the riser flanges in solid lines and the related tubes and the laser module in phantom lines. The "A" figures also have a cut away view with the section taken along lines A-A of the "B" figures removed from the view. In the "B" figures, there is shown a transverse cross-section of the flange and laser module taken along the transverse connection between the two flanges.

Figure 2A:
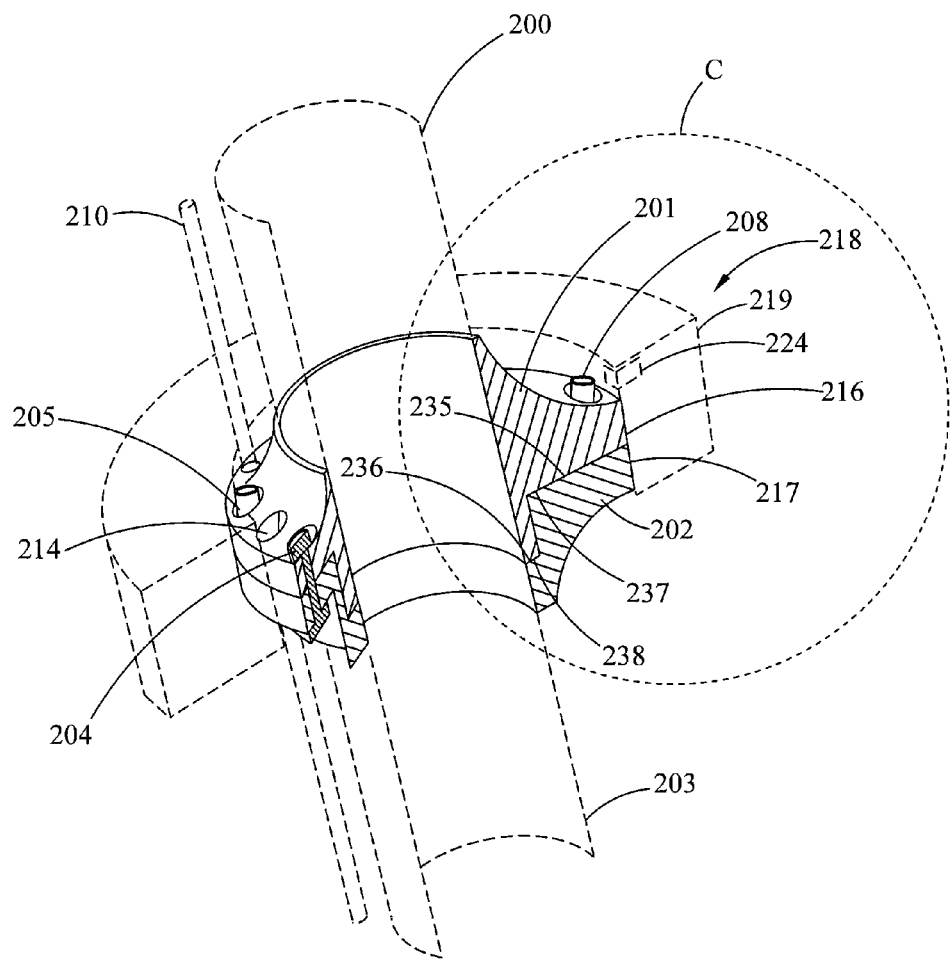
FIG. 2A is a partial cutaway view of an embodiment of a laser module and riser sections of the present invention to be used with the laser-riser BOP package of FIG. 1.
Figure 2B:
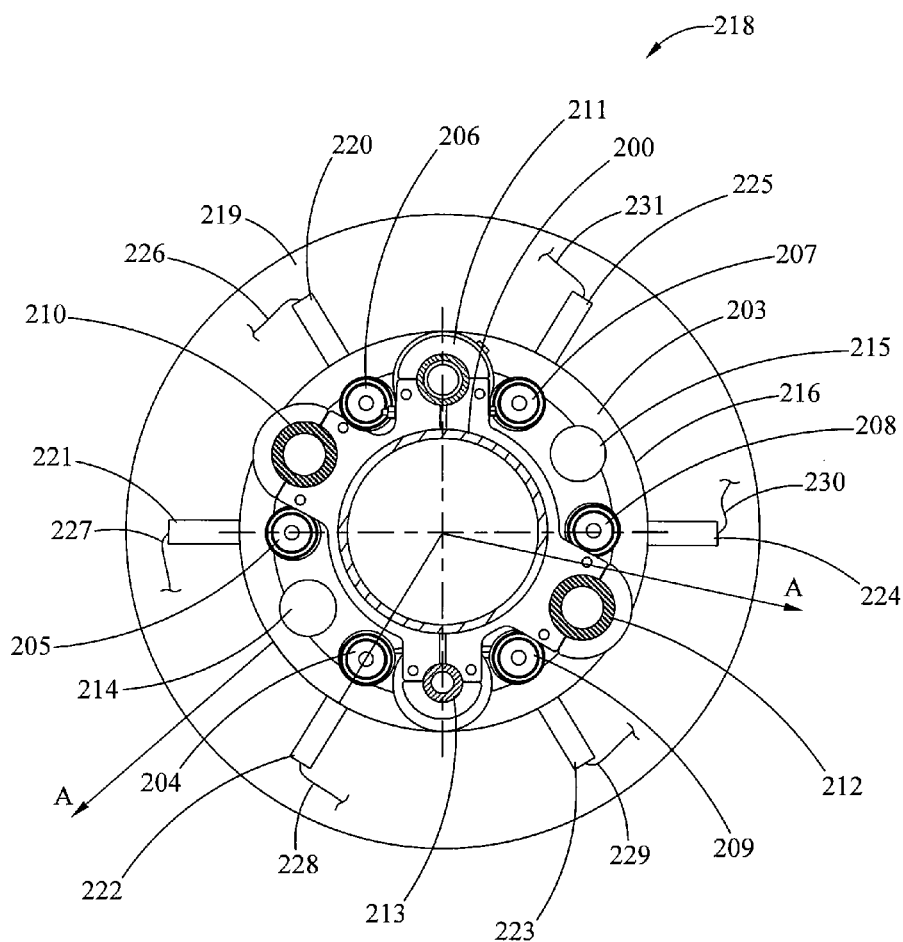
FIG. 2B is a transverse cross-section view of the laser module and riser sections of FIG. 2A.
Figure 2C:
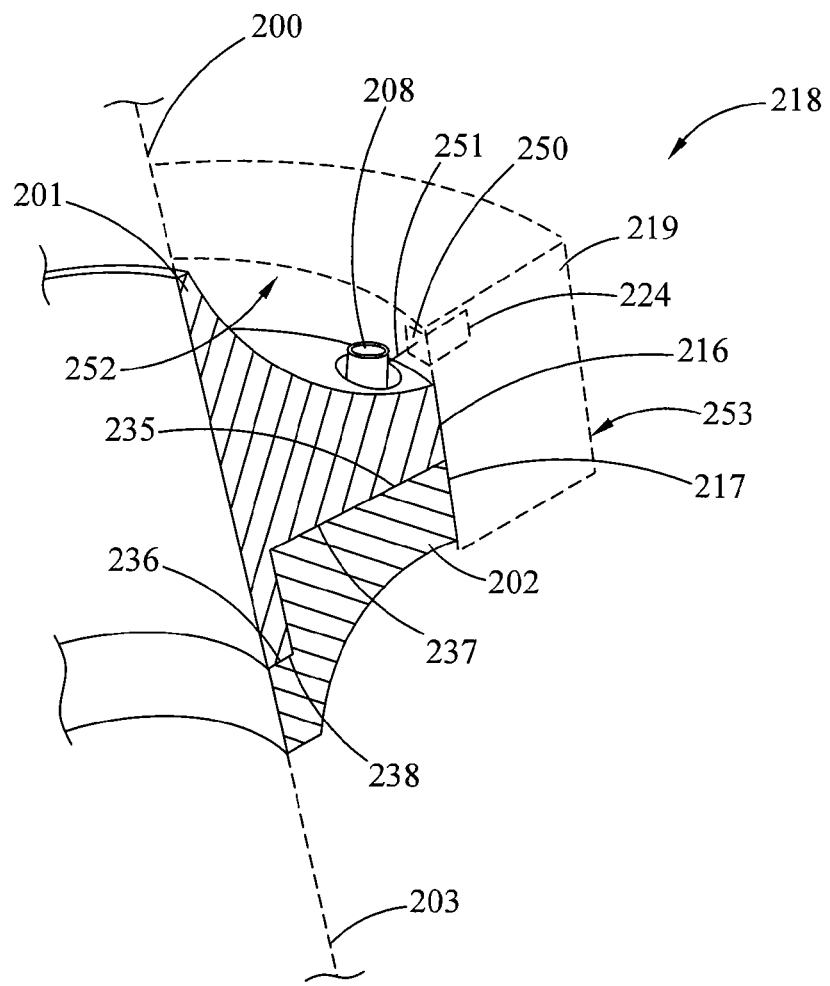
FIG. 2C is an enlarged view of section C of FIG. 2A.

Thus, turning to FIGS. 2A, 2B, & 2C there is provided a riser section center tube 200 that has a flange 201 attached at its lower end. Riser section center tube 203 has a flange 202 attached at it upper end. (Although not shown in this figure, it is recognized that riser section center tube 200 would have a flange attached to its upper end and that riser section center tube 203 would have a flange attached to its lower end.) Flange 201 is attached to upper flange 202 by bolts and nuts 204, 205, 206, 207, 208, 209. Also associated with the riser sections 200, 203 and extending through the flanges 201, 202 are a choke line 210, a booster line 211, a kill line 212, a hydraulic line 213 and blanks (e.g., open unfilled holes in the flange) 214, 215. Flange 201 has an outer surface 216, a mating surface 235 and a shoulder surface 236. Flange 203 has an outer surface 217, a mating surface 237 and a shoulder surface 238. When the flanges 201 and 202 are engaged and connected, surface 235 is engaged against surface 237 and surface 236 is engaged against surface 238. Laser cutters 220, 221, 222, 223, 224, 225 have flexible support cables 226, 227, 228, 229, 230, 231 respectively. The laser cutters are optically associated with at least one high power laser. The laser cutters are contained within housing 219 of laser module 218. In this embodiment the laser cutters are positioned adjacent the heads of the bolts, see, e.g., laser cutter 219 and bolt 208, and have beam paths direct toward the bolts.

Figure 3A:
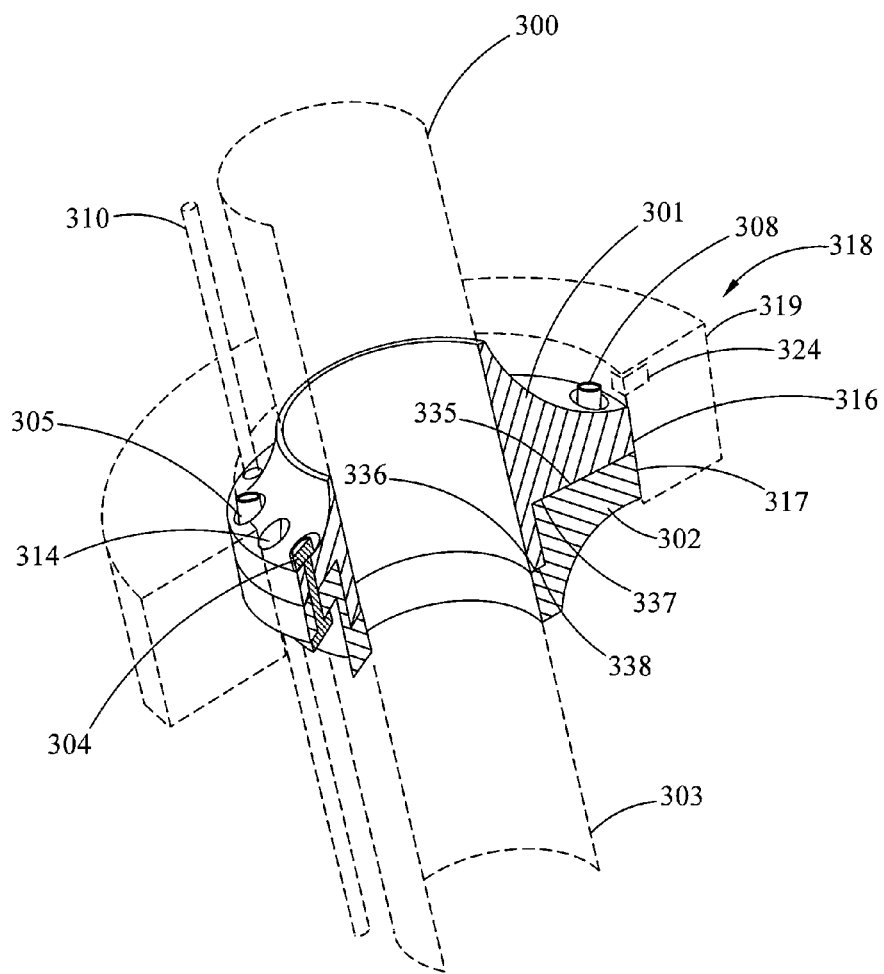
FIG. 3A is a partial cutaway view of a second embodiment of a laser module and riser sections of the present invention to be used with the laser-riser BOP package of FIG. 1.
Figure 3B:
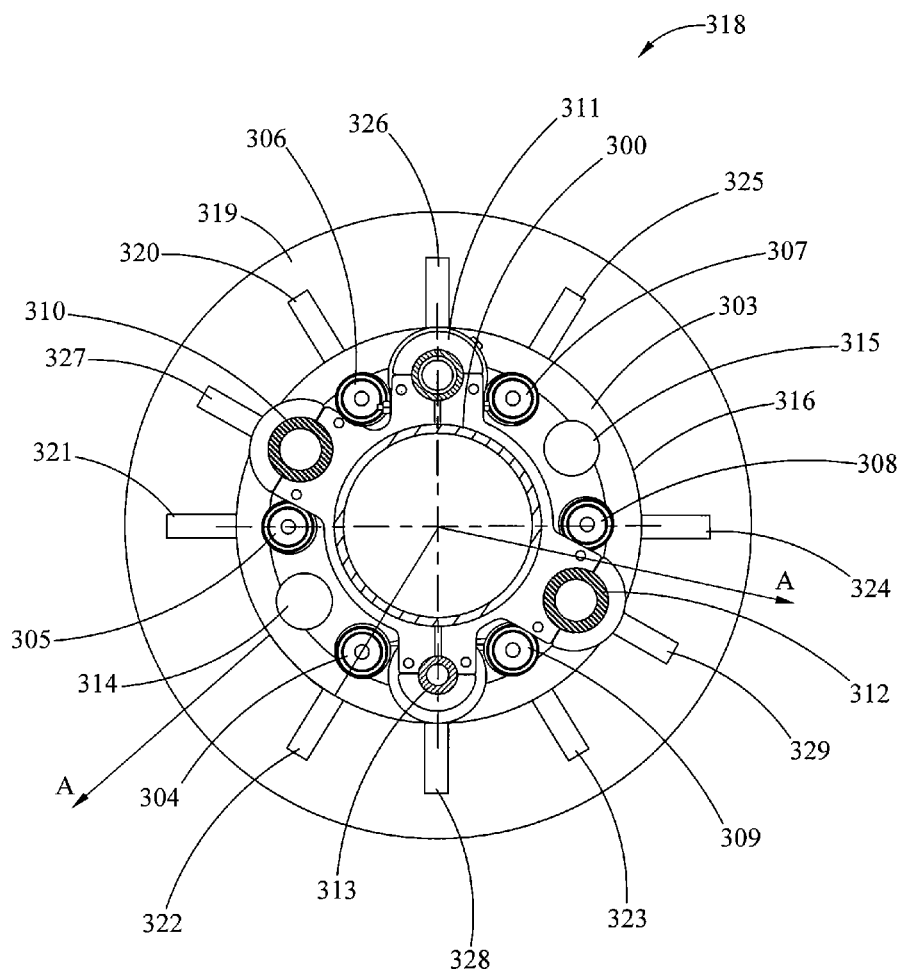
FIG. 3B is a transverse cross-section view of the laser module and riser sections of FIG. 3A.

Turning to FIGS. 3A & 3B there is provided a riser section center tube 300 that has a flange 301 attached at its lower end. Riser section center tube 303 has a flange 302 attached at it upper end. (Although not shown in this figure, it is recognized that riser section center tube 300 would have a flange attached to its upper end and that riser section center tube 303 would have a flange attached to its lower end.) Flange 301 is attached to upper flange 302 by bolts and nuts 304, 305, 306, 307, 308, 309. Also associated with the riser sections 300, 303 and extending through the flanges 301, 302 are a choke line 310, a booster line 311, a kill line 312, a hydraulic line 313 and blanks (e.g., open unfilled holes in the flange) 314, 315. Flange 301 has an outer surface 316, a mating surface 335 and a shoulder surface 336. Flange 303 has an outer surface 317 a mating surface 337 and a shoulder surface 338. When the flanges 301 and 302 are engaged and connected, surface 335 is engaged against surface 337 and surface 336 is engaged against surface 338. Laser cutters 320, 321, 322, 323, 324, 325, 326, 327, 328, 329 each having a flexible support cable (not shown). The laser cutters are optically associated with at least one high power laser. The laser cutters are contained within housing 319 of laser module 318. In this embodiment, the laser cutters are positioned adjacent the heads of the bolts, see, e.g., laser cutter 334 and bolt 308, and adjacent the external pipes, see, e.g., laser cutter 326 and booster line 311. The laser cutters have beam paths direct toward the bolts and external pipes.

Figure 4A:
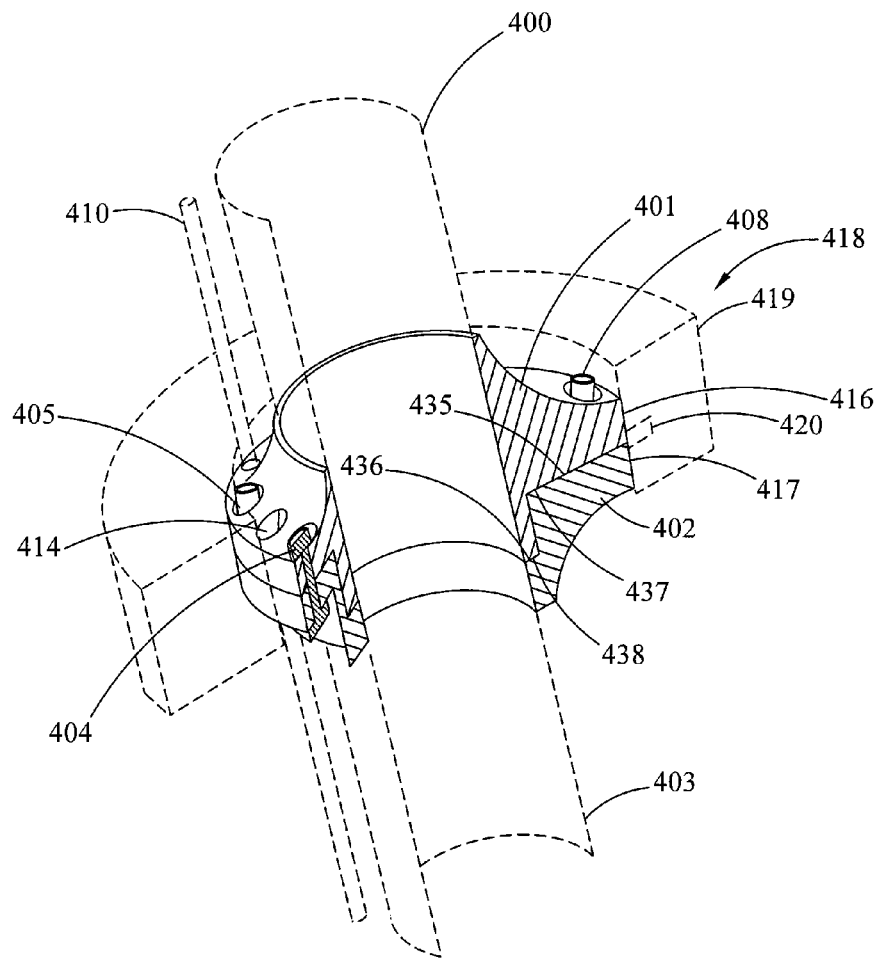
FIG. 4A is a partial cutaway view of a third embodiment of a laser module and riser sections of the present invention to be used with the laser-riser BOP package of FIG. 1.
Figure 4B:
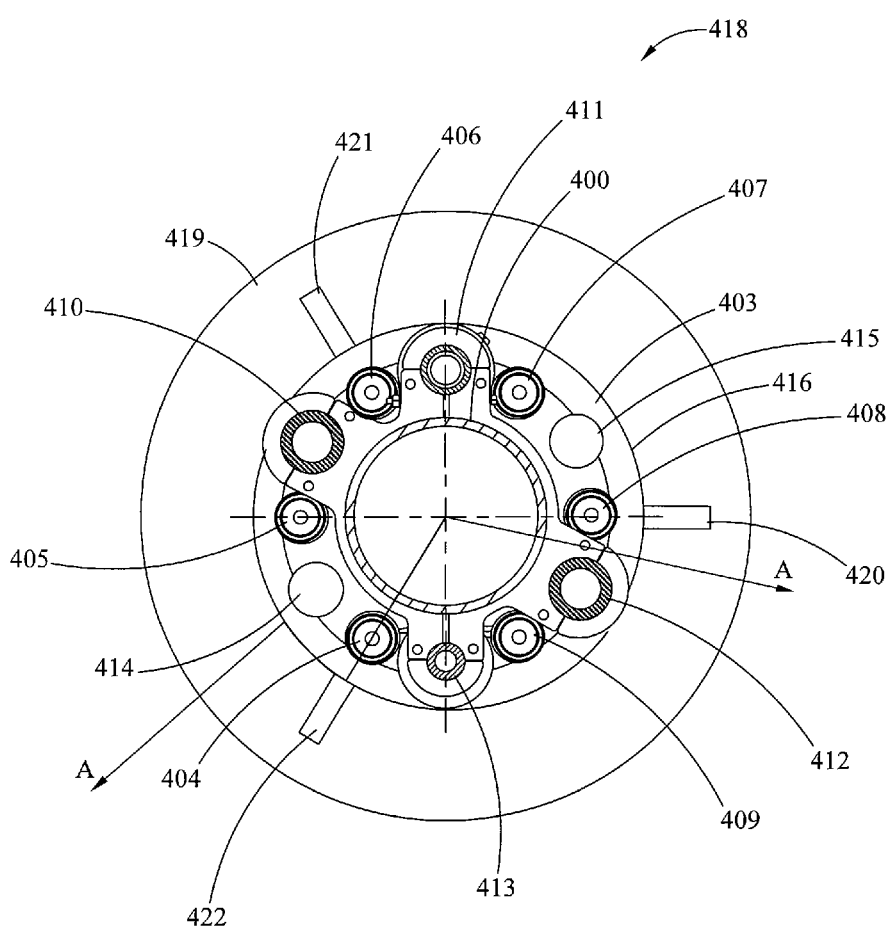
FIG. 4B is a transverse cross-section view of the laser module and riser sections of FIG. 4A.

Turning to FIGS. 4A & 4B there is provided a riser section center tube 400 that has a flange 401 attached at its lower end. Riser section center tube 403 has a flange 402 attached at it upper end. (Although not shown in this figure, it is recognized that riser section center tube 400 would have a flange attached to its upper end and that riser section center tube 403 would have a flange attached to its lower end.) Flange 401 is attached to upper flange 402 by bolts and nuts 404, 405, 406, 407, 408, 409. Also associated with the riser sections 400, 403 and extending through the flanges 401, 402 are a choke line 410, a booster line 411, a kill line 412, a hydraulic line 413 and blanks (e.g., open unfilled holes in the flange) 414, 415. Flange 401 has an outer surface 416, a mating surface 435 and a shoulder surface 436. Flange 403 has an outer surface 417 a mating surface 437 and a shoulder surface 438. When the flanges 401 and 402 are engaged and connected, surface 435 is engaged against surface 437 and surface 436 is engaged against surface 438. Laser cutters 420, 421, 422 each having a flexible support cable (not shown). The laser cutters are optically associated with at least one high power laser. The laser cutters are contained within housing 419 of laser module 418. In this embodiment, the laser cutters are positioned adjacent the connection of the two flanges, i.e., ring where the outer surfaces 417, 416 and mating surfaces 435, 437 converge. Thus, in this embodiment the laser cutters are directed into the flange, and have beam paths that intersect, or follow, the annular disc created by the engagement of mating surfaces 435, 437.

Figure 5A:
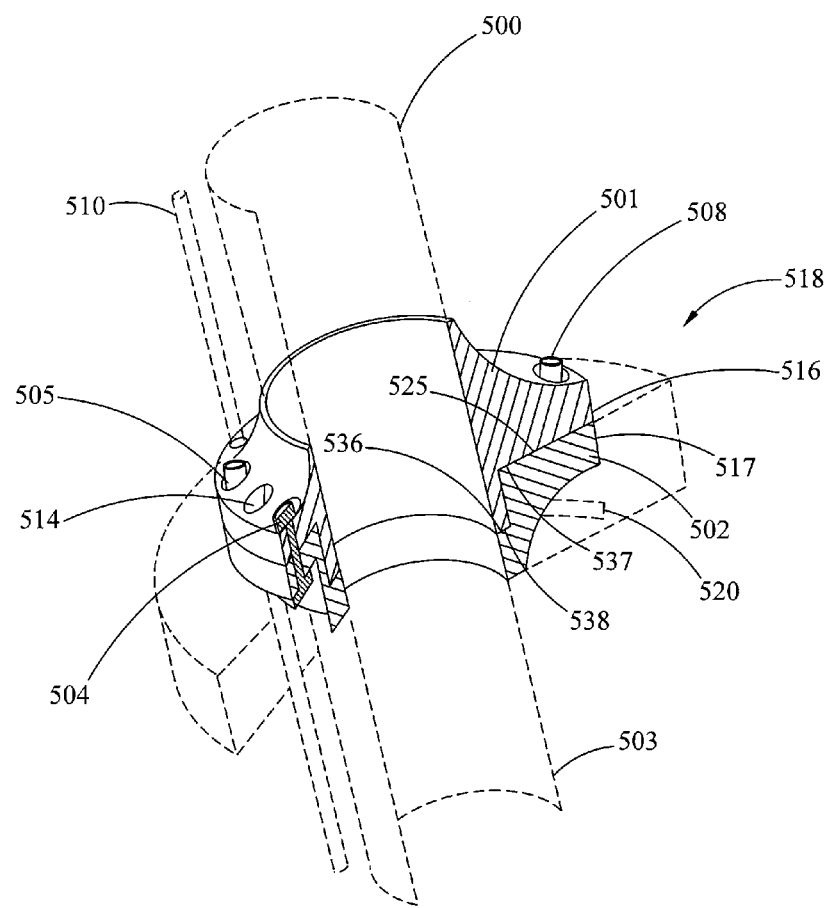
FIG. 5A is a partial cutaway view of a fourth embodiment of a laser module and riser sections of the present invention to be used with the laser-riser BOP package of FIG. 1.
Figure 5B:
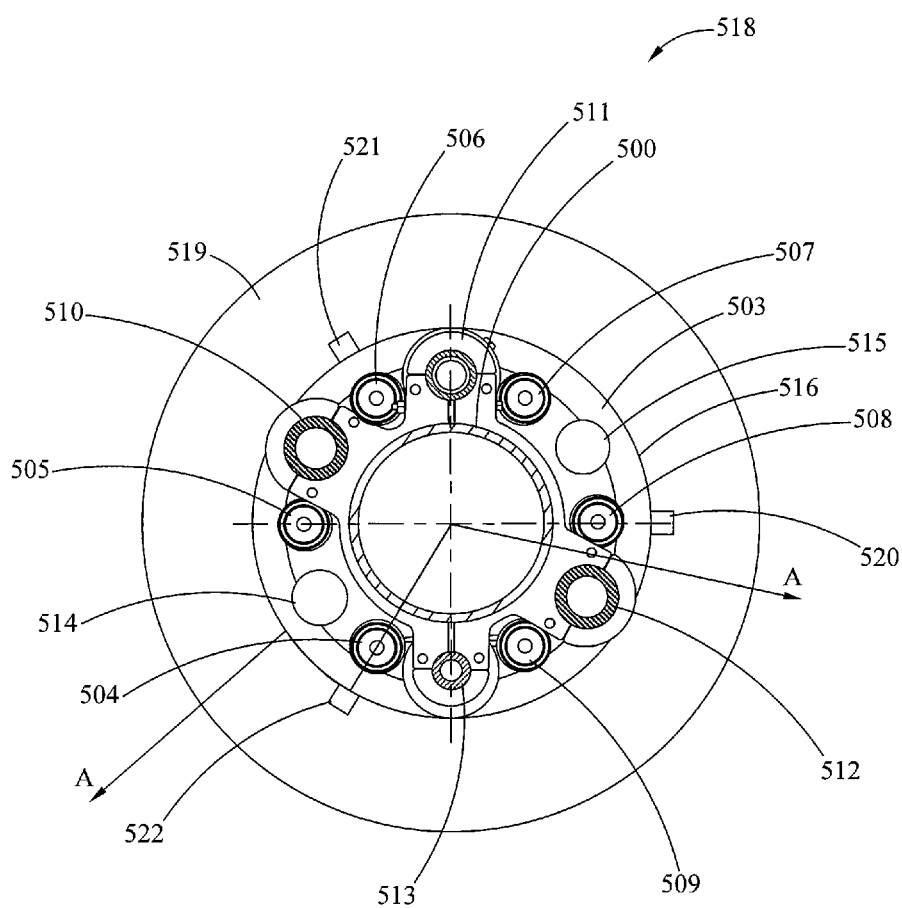
FIG. 5B is a transverse cross-section view of the laser module and riser sections of FIG. 5A.

Turning to FIGS. 5A & 5B there is provided a riser section center tube 500 that has a flange 501 attached at its lower end. Riser section center tube 503 has a flange 502 attached at it upper end. (Although not shown in this figure, it is recognized that riser section center tube 500 would have a flange attached to its upper end and that riser section center tube 503 would have a flange attached to its lower end.) Flange 501 is attached to upper flange 502 by bolts and nuts 504, 505, 506, 507, 508, 509. Also associated with the riser sections 500, 503 and extending through the flanges 501, 502 are a choke line 510, a booster line 511, a kill line 512, a hydraulic line 513 and blanks (e.g., open unfilled holes in the flange) 514, 515. Flange 501 has an outer surface 516, a mating surface 535 and a shoulder surface 536. Flange 503 has an outer surface 517 a mating surface 537 and a shoulder surface 538. When the flanges 501 and 502 are engaged and connected, surface 535 is engaged against surface 537 and surface 536 is engaged against surface 538. Laser cutters 520, 521, 522 each having a flexible support cable (not shown). The laser cutters are optically associated with at least one high power laser. The laser cutters are contained within housing 519 of laser module 518. In this embodiment, the laser cutters are positioned adjacent the shoulders 536, 538. In this way the laser has a beam path that is directed from the laser cutter to the area where the shoulders 536, 538 engage each other. Additionally, in this embodiment the beam path is directed through the thinnest area of the flange connections, and thus presents the laser cutters with the least amount of material to remove.

Figure 6A:
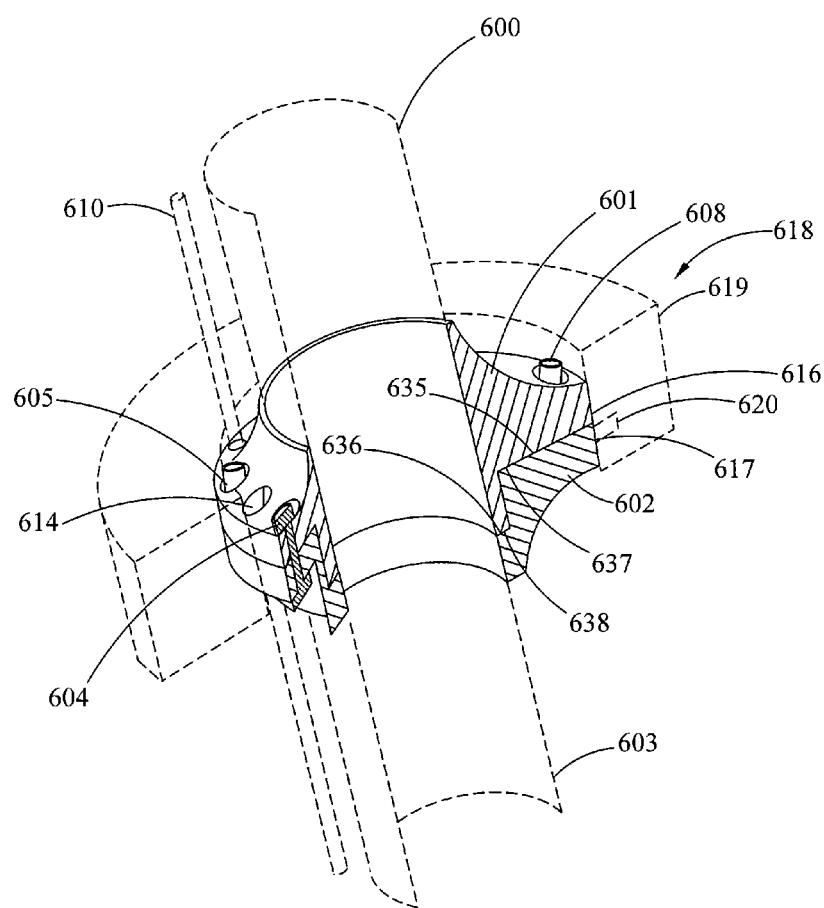
FIG. 6A is a partial cutaway view of a fifth embodiment of a laser module and riser sections of the present invention to be used with the laser-riser BOP package of FIG. 1.
Figure 6B:
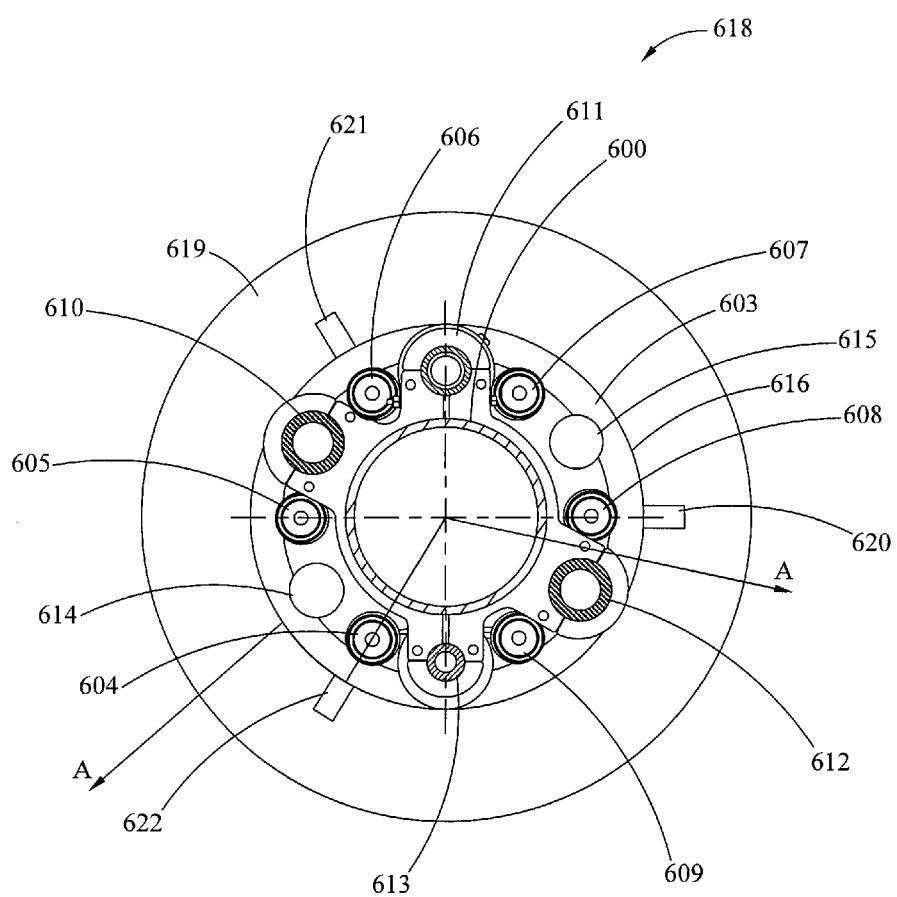
FIG. 6B is a transverse cross-section view of the laser module and riser sections of FIG. 6A.

Turning to FIGS. 6A & 6B there is provided a riser section center tube 600 that has a flange 601 attached at its lower end. Riser section center tube 603 has a flange 602 attached at it upper end. (Although not shown in this figure, it is recognized that riser section center tube 600 would have a flange attached to its upper end and that riser section center tube 603 would have a flange attached to its lower end.) Flange 601 is attached to upper flange 602 by bolts and nuts 604, 605, 606, 607, 608, 609. Also associated with the riser sections 600, 603 and extending through the flanges 601, 602 are a choke line 610, a booster line 611, a kill line 612, a hydraulic line 613 and blanks (e.g., open unfilled holes in the flange) 614, 615. Flange 601 has an outer surface 616, a mating surface 635 and a shoulder surface 636. Flange 603 has an outer surface 617 a mating surface 637 and a shoulder surface 638. When the flanges 601 and 602 are engaged and connected, surface 635 is engaged against surface 637 and surface 636 is engaged against surface 638. Laser cutters 620, 621, 622 each having a flexible support cable (not shown). The laser cutters are optically associated with at least one high power laser. The laser cutters are contained within housing 619 of laser module 618. In this embodiment, the laser cutters are positioned adjacent the nuts of the bolts, see, e.g., laser cutter 620 and nut on bolt 608, and have beam paths direct toward the nuts.

A housing for a laser module can be integral with one of the flanges. The house can be in two pieces, with each piece being integral with a flange, and thus, the housing pieces will be joined together as the flanges are connected. The housing may extend inwardly, and join with the central tube, either above or below the flange. When the housing extends inwardly it may be configured to keep water out of the beam path between the laser cutter and the material to be cut, e.g., a bolt head. However, in this housing configuration, care must be taken so that the housing is assembled in a manner that provides for access to the bolts and nuts, as well as, passage for the external pipes. The housing may be in a split ring type of configuration or may be in two or more semi-circular sections, which sections are connected together around the flanges after the flanges have been connected together, or around the center tube or riser.

Preferably, upon activation the laser cutters will propagate (also commonly referred to as firing or shooting the laser to create a laser beam) their respective laser beams along their respective beam paths. The cutters will then rotate around the riser causing the beam path to cut additional material. For example in the embodiment of FIGS. 4A-B the laser cutters would have to rotate about a little more than ⅓ of a complete rotation to cut through the entire circumference of the riser joint connections. Non-rotating laser cutters may be utilized, however, in such a case to assure the quick, clean and controlled severing of the riser greater numbers of cutters should be used, such as for example the embodiment of FIG. 3A-B where each bolt has a laser cutter. The delivery of the high power laser energy beam will cut, or otherwise, remove the material that is in the beam path. Thus, the high power laser energy, for example, can sever the bolts holding two riser flanges together; and separate or sever the two riser sections that were held together by those bolts.

Although not shown in the figures, the laser modules and the teachings of this specification may be utilized with any type of riser coupling presently existing, including dog styles couplings and rotating key style couplings, as well as, future riser coupling systems, yet to be developed, and riser coupling systems, which the teachings herein may give rise to.

Figures 7A, 7B:
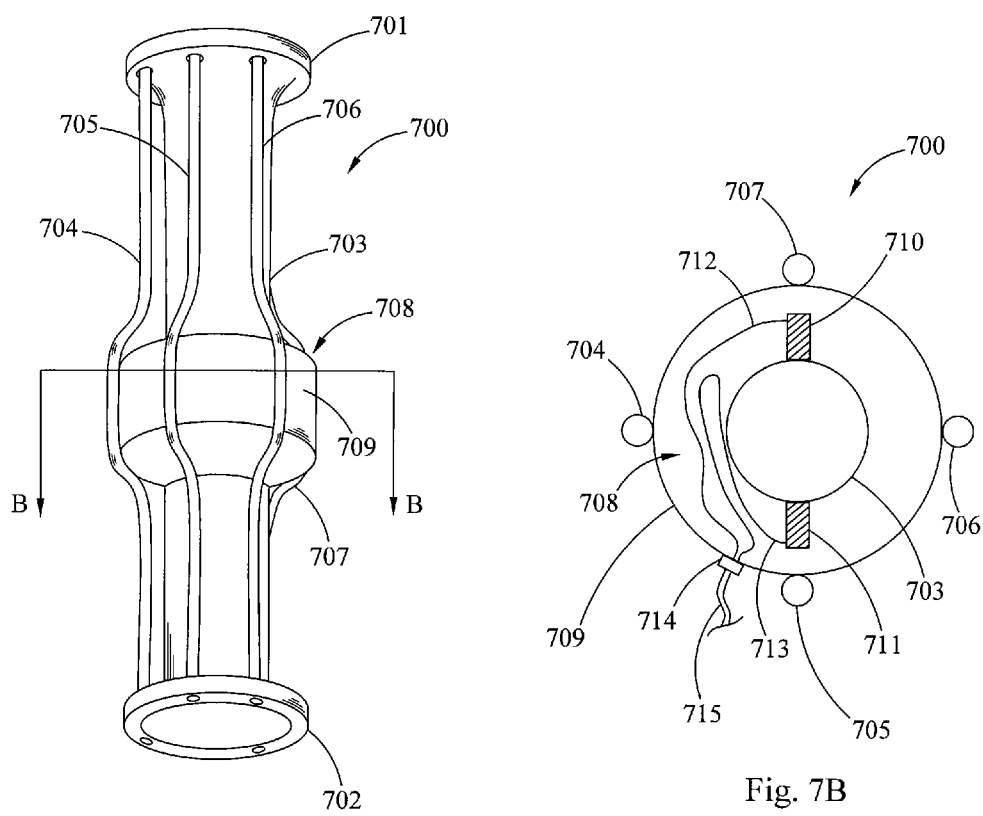
FIG. 7A is a perspective view an embodiment of a laser riser section of the present invention to be used with the laser-riser BOP package of FIG. 1.
FIG. 7B is a transverse cross-section view of the laser riser section of FIG. 7A.

FIGS. 7A & 7B show an embodiment of a laser riser disconnect section. FIG. 7B is a transverse cross-sectional view of the laser riser disconnect section taken along line B-B of FIG. 7A. There is provided a riser section 700. The riser section 700 has a center tube 703 that has at its ends an upper coupling 701 and a lower coupling 702. These coupling may be any type of riser coupling known to those of skill in the drilling arts and would include flange-style, dog-style and rotating key-style couplers. The riser section 700 has associated therewith four external pipes, a kill line 704, a choke line 705, a booster line 706 and a hydraulic line 707. The riser section 700 has a laser module 708 having a housing 709. The external pipes are configured to go around, e.g., be exterior to, the laser housing. Thus, laser cutters 710, 711 can be adjacent the center tube 703 of the riser section 700. The laser cutters have flexible support cables 712, 713 that are feed through feed through assembly 714 and into conduit 715 for connection to a source of high power laser energy and other materials that may be utilized in the operation or monitoring of the laser cutters. The flexible support cables have extra slack or length to accommodate the rotation of the laser cutters 710, 711 around the circumference of the center tube 703. In the embodiment of FIGS. 7A & 7B the cutters would have to move about ½ of a rotation to sever the center tubular 703.

Figure 9:
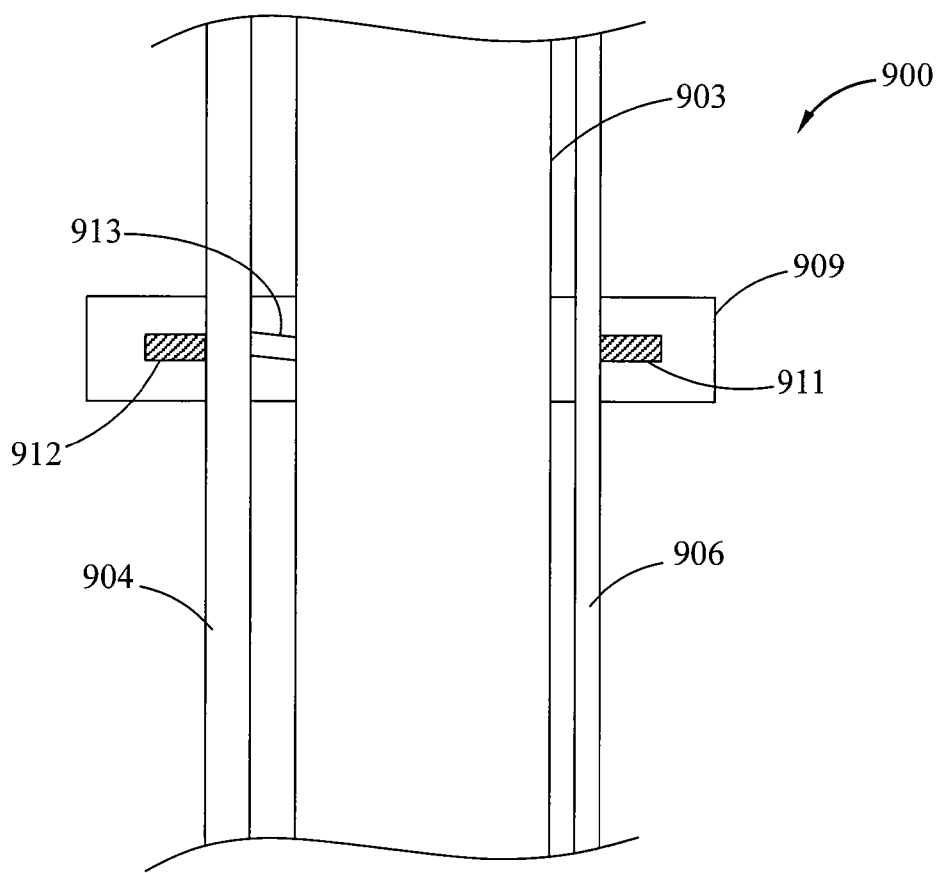
FIG. 9 is a cross-sectional view of a seventh embodiment of a laser module of the present invention positioned on a riser section to be used with the laser-riser BOP package of FIG. 1.

In FIG. 9 there is provided a laser riser module for attachment to a mid-section of a riser, for severing the riser in a section removed from the riser couplings. Thus, in FIG. 9 there is shown a section of riser 900, in a location along the riser that is removed from the couplings (not shown in this figure). The riser section 900 has a center tube 903 and kill and coke lines, e.g., 904, 906. The riser section 900 has a laser module 909 that has laser cutters, e.g., 911, 912, and 913. The module and the laser cutters are positioned in a manner that the laser cutters will cut the choke and kill lines, and preferably all of the lines on the outside of the central tube, as well as, the central tube. The cutters in this module may rotate, be moved in a fan motion. More or less cutters may be employed. The module may be fixed to the riser section, attached to riser section during deployment, or after deployment by an ROV ("Remote Operated Vehicle"), or it may be integral or detachable.

The laser cutter 224 of FIGS. 2A, 2B & 2C will be used as an illustration, it being understood that the other laser cutters disclosed and described herein may have similar configurations. Thus, turning to FIG. 2C, which is an enlarged view of a section of FIG. 2A, there is shown a laser discharge end 250 of the laser cutter 224. A beam path 251, which a laser beam propagated from laser cutter 224 would follow, extends between laser discharge end 250 and the component of the riser section to be cut, which in this illustration would be bolt 208. The housing 219 has an inner area 252 that is configured or otherwise adapted to contact, be associated with or engage the components of the riser that are to be cut by the laser. The housing 219 has an outer area 253 that is removed from the inner area 252. In general, the housing inner area will be closest to the riser and the housing outer area will be furthest from the riser.

It is desirable to have quick disconnect valves or assemblies on the external pipes to facilitate their disconnecting, and closing off or shutting off, when the center tube of the riser, the external pipes, the bolts or other means holding the riser sections together, or all of them are severed. These disconnect means for the external tubes should be positioned in a manner that prevents spillage of the material they are carrying if the laser module is activated and severs the riser or otherwise weakens the riser so that a quick disconnect is possible.

The laser modules may contain a shield to provide protection to the laser cutters, to a lesser or greater extent, from the water, pressure or other subsea environmental conditions in which the riser is deployed. The shield may be part of the housing or it may be a separate component. It may assist in the management of pressure, or contribute to pressure management, for the laser module. The shield may be made of a material, such as steel or other type of metal or other material, that is both strong enough to protect the laser cutters and yet be quickly cut by the laser beam when it is fired. The shield could also be removable from the beam path of the laser beam. In this configuration upon activation of the laser module the shield would be moved away from the beam path. In the removable shield configuration, the shield would not have to be easily cut by the laser beam.

Although single laser modules are shown for a single riser section, multiple laser modules, modules of different shapes, and modules in different positions, may be employed. Further multiple riser sections each having its own laser module may be utilized in a riser at various positions between the offshore rig and the BOP. The ability to make precise and predetermined laser energy delivery patterns to the riser and the ability to make precise and predetermined cuts in and through risers, provides the ability, even in an emergency situation, to sever the riser without crushing it and to do so with minimal damage to the riser.

The laser module may be a single piece that is machined to accommodate the laser cutters, or it may be made from multiple pieces that are fixed together in a manner that provides sufficient strength for its intend use, and in particular to withstand pressures of 1,000 psi, 2,000 psi, 4,500 psi, 5,000 psi and greater. The modules need to be able to operate at the pressures that will occur at depths where the BOP is located, thus for example at depths of 1,000 ft, 5,000 ft, 10,000 ft and potentially greater. The area of the housing that contains the laser cutter may be machined out, or otherwise fabricated to accommodate the laser cutters, while maintaining the strength requirements for the body's intended use. The housing of the laser module may also be two or more separate components or parts, e.g., one component for the upper half and one for the lower half, or one or more components for the section of a ring that is connected around the riser. These components could be attached to each other by, for example, bolted flanges, or other suitable attachment means known to one of skill in the offshore drilling arts. The laser module or the housing may have a passage, passages, channels, or other such structures, to convey fiber optic cables for transmission of the laser beam from the laser source into the housing and to the laser cutter, as well as, other cables that relate to the operation or monitoring of the laser delivery assembly and its cutting operation.

Figure 8A:
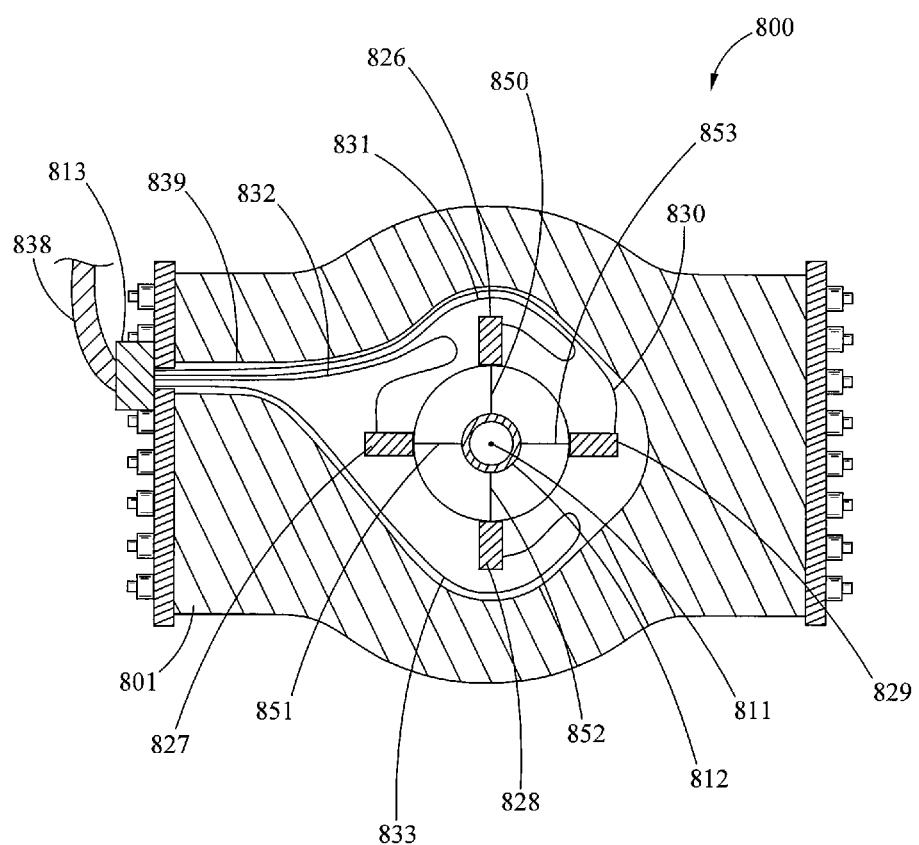
FIGS. 8A, 8B & 8C are transverse cross-sectional view of a sixth embodiment of a laser module of the present invention showing the module at phases of its operation to be used with the laser-riser BOP package of FIG. 1.
Figure 8B:
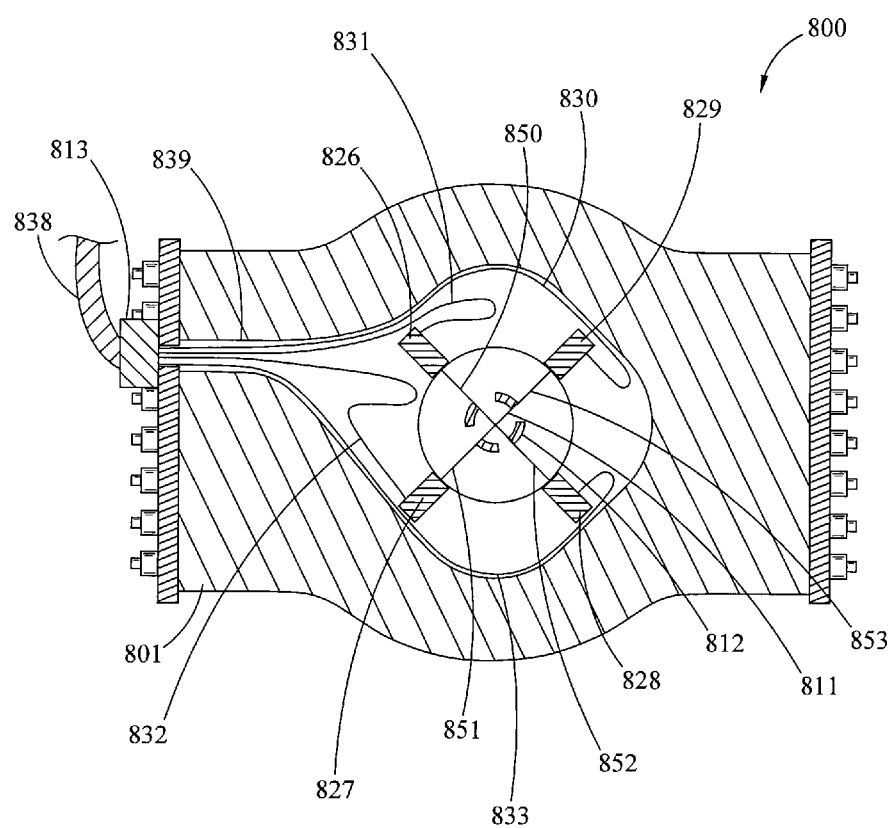
Figure 8C:
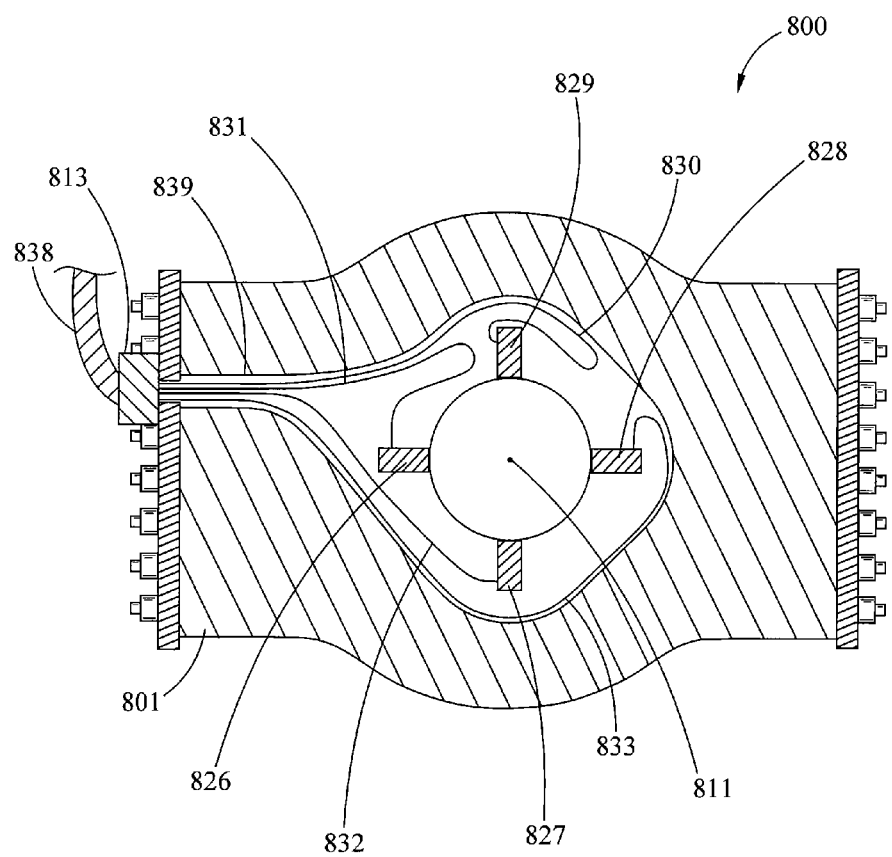

FIGS. 8A to 8C show cross-sectional views of an embodiment of a laser module. These figures also show the sequences of operation of the laser module 800, in cutting, for example, a riser coupling 812. In this embodiment the laser module 800 has four laser cutters 826, 827, 828, and 829. Flexible support cables are associated with each of the laser cutters. Thus, flexible support cable 831 is associated with laser cutter 826, flexible support cable 832 is associated with laser cutter 827, flexible support cable 833 is associated with laser cutter 828, and flexible support cable 830 is associated with laser cutter 829. The flexible support cables are located in channel 839 and enter feed-through assembly 813. In the general area of the feed-through assembly 813, the support cables transition from flexible to semi-flexible, and may further be included in conduit 838 for conveyance to a high power laser, or other sources of materials for the cutting operation. The flexible support cables 830, 831, 832, and 833 have extra, or additional length, which accommodates the orbiting of the laser cutters 826, 827, 828 and 829 around the axis 811, and around the riser coupling 812.

FIGS. 8A to 8C show the sequence of activation of the laser module 800 to sever a riser coupling 812. In this example, the first view (e.g., a snap shot, since the sequence preferably is continuous rather than staggered or stepped) of the sequence is shown in FIG. 8A. As activated the four lasers cutters 826, 827, 828 and 829 shoot laser beams that travel along beam paths 850, 851, 852 and 853. The beam paths 850, 851, 852 and 853 extend from the laser cutters 826, 827, 828 and 829 toward the center axis 811 and thus intersect the riser coupling 812. The beams are directed toward the center axis 811 of the riser coupling 812. As such, the beams are shot from within the module, from outside of the riser and travel along their respective beam paths toward the center axis of the riser coupling. The laser beams strike riser coupling 812 and begin cutting, i.e., removing material from, the riser coupling 812.

If the riser coupling 812 is viewed as the face of a clock, the laser cutters 826, 827, 828 and 829 could be viewed as being initially positioned at 12 o'clock, 9 o'clock, 6 o'clock and 3 o'clock, respectively. Upon activation, the laser cutters and their respective laser beams, begin to orbit around the center axis 811, and the riser coupling 812. (In this configuration the laser cutters would also rotate about their own axis as they orbit, and thus, if they moved through one complete orbit they would also have moved through one complete rotation.) In the present example the cutters and beams orbit in a counter clockwise direction, as viewed in the figures; however, a clockwise rotation may also be used.

Thus, as seen in the next view of the sequence, FIG. 8B, the laser cutters, 826, 827, 828 and 829 have rotated 45 degrees, with laser beams that travel along beam paths 850, 851, 852 and 853 having cut through four ⅛ sections (i.e., a total of half) of the circumference of the riser coupling 812. FIG. 8C then shows the cutter having moved through a quarter turn. Thus, cutter 826 could be seen as having moved from the 12 o'clock position to 9 o'clock position, with the other cutters having similarly changed their respective clock face positions. Thus, by moving through a quarter turn the beam paths 850, 851, 852 and 853 would have crossed the entire circumference of the riser coupling 812 and the laser beams traveling along those beam paths would severe the riser coupling.

The rate of the orbital movement of the laser cutters is dependent upon the number of cutters used, the power of the laser beam when it strikes the material to be cut, the thickness of thereof, and the rate at which the laser cuts the material. The rate of the orbital motion should be slow enough to ensure that the intended cuts can be completed. In addition to orbiting cutters, the laser beam can be scanned, e.g., moved in a fan like pattern. In this manner the beam path would be scanned along the area to be cut, e.g., an area of a tubular, while the cutter, or at least the base of the cutter, remained in a fixed position. This scanning of the laser beam can be accomplished, for example, by moving the cutter back and forth about a fixed point, e.g, like the movement of an oscillating fan. It may also be accomplished by having optics contained within the cutter that scans the beam path, e.g., a laser scanner, and thus the laser beam in the fan like pattern. For example a multi-faceted mirror or prim that is rotated may be utilized as a scanner. It should be noted, however, that scanning processes in general might be less efficient the other cutting approaches provided in this specification. Additional scanning patterns for the beam path and laser beam many also be employed to accomplished or address a specific cutting application or tubular configuration in a BOP cavity.

The orbital or other movement of the laser cutters can be accomplished by mechanical, hydraulic and electro-mechanical systems known to the art. For example, the cutters can be mounted to step motors that are powered by batteries, in the BOP, electrical cables from the surface, or both. The step motors may further have controllers associated with them, which controllers can be configured to control the step motors to perform specific movements corresponding to specific cutting steps. Cam operated systems may be employed to move the cutters through a cutting motion or cycle. The cams may be driven by electric motors, hydraulic motors, hydraulic pistons, or combinations of the forgoing, to preferably provide for back-up systems to move the cutters, should one motive means fail. A gearbox, a rack gear assembly, or combinations thereof may be utilized to provide cutter movement, in conjunction with an electric motor, hydraulic motor or piston assembly. The control system may be integral to the cutter motive means, such as a step motor control combination, may be part of the BOP, such as being contained with the other control system on the BOP, or it may be on the rig, or combinations of the forgoing.

The use of the term "completed" cut, and similar such terms, includes severing the riser into two sections, i.e., a cut that is all the way through the wall and around the entire circumference of the riser central tube, as well as, cuts in which enough material is removed from the riser to sufficiently weaken the riser to ensure that a controlled and quick release or disconnect to the rig from the BOP can occur. Depending upon the particular configuration and the riser-BOP packages's intended use, a completed cut could be, for example: severing the riser into two separate sections; severing the riser central tube into two separate sections; severing the riser central tube and at least one or more of the external tubes into separate sections; the removal of a ring of material around the outer portion of the riser, from about 10% to about 90% of the wall thickness; a number of perforations created in the wall, but not extending through the wall of the riser; a number of perforations going completely through the wall of the riser; a number of slits created in the wall, but not extending through the wall of the riser; a number of slits going completely through the wall of the riser; the material removed by the configurations disclosed in this specification; cutting the means used to connect two riser sections together; weakening the means used to connect two riser sections together, using any of the forgoing types of material removal; or, other patterns of material removal and combinations of the foregoing. It is preferred that the complete cut is made in less than one minute, and more preferable that the complete cut be made in 30 seconds or less.

The greater the number of laser cutters in a rotating laser module, the slower the rate of orbital motion can be to complete a cut in the same amount of time. Further, increasing the number of laser cutters decreases the time to complete a cut of a riser, without having to increase the orbital rate. Increasing the power of the laser beams will enable quicker cutting of tubulars, and thus allow faster rates of orbiting, fewer laser cutters, shorter time to complete a cut, or combinations thereof.

The laser cutters used in the examples and illustrations of the embodiments of the present inventions may be any suitable device for the delivery of high power laser energy. Thus, any configuration of optical elements for culminating and focusing the laser beam can be employed. A further consideration, however, is the management of the optical effects of riser fluids, e.g., sea water or water external to the riser, mud or other material from a cut choke line, cut kill line or cut center tube of a riser, or hydraulic fluid from a cut hydraulic line, that may be located within the beam path between laser cutter and the riser, coupling, center pipe, external pipe, bolt, nut or other structure to be cut.

Such riser fluids could include, by way of example, water, seawater, salt water, brine, drilling mud, nitrogen, inert gas, diesel, mist, foam, or hydrocarbons. There can also likely be present in these drilling fluids borehole cuttings, e.g., debris, which are being removed from, or created by, the advancement of the borehole or other downhole operations. There can be present two-phase fluids and three-phase fluids, which would constitute mixtures of two or three different types of material. These riser fluids can interfere with the ability of the laser beam to cut the tubular. Such fluids may not transmit, or may only partially transmit, the laser beam, and thus, interfere with, or reduce the power of, the laser beam when the laser beam is passed through them. If these fluids are flowing, such flow may further increase their non-transmissiveness. The non-transmissiveness and partial-transmissiveness of these fluids can result from several phenomena, including without limitation, absorption, refraction and scattering. Further, the non-transmissiveness and partial-transmissiveness can be, and likely will be, dependent upon the wavelength of the laser beam.

In a 21" riser depending upon the configuration of the laser cutters and the size of the riser coupling, the laser beam could be required to pass through over 8" of riser fluids (e.g., distance from outer surface of an HMF flange to outer surface of the center tube of a riser section). In other configurations the laser cutters may be positioned in close, or very close, proximity to the structure to be cut and moved in a manner where this close proximity is maintained. In these configurations the distance for the laser beam to travel between the laser cutters and the structure to be cut may be maintained within about 2", less than about 2", less than about 1" and less than about ½", and maintained within the ranges of less than about 3" to less than about ½", and less than about 2" to less than about ½".

In particular, for those configurations and embodiments where the laser has a relatively long distance to travel, e.g., greater than about 1" or 2" (although this distance could be more or less depending upon laser power, wavelength and type of drilling fluid, as well as, other factors) it is advantageous to minimize the detrimental effects of such riser fluids and to substantially ensure, or ensure, that such fluids do not interfere with the transmission of the laser beam, or that sufficient laser power is used to overcome any losses that may occur from transmitting the laser beam through such fluids. To this end, mechanical, pressure and jet type systems may be utilized to reduce, minimize or substantially eliminate the effect of the drilling fluids on the laser beam.

For example, mechanical devices may be used to isolate the area where the laser cut is to be performed and the riser fluid removed from this area of isolation, by way of example, through the insertion of an inert gas, or an optically transmissive fluid, such as an oil or diesel fuel. The use of a fluid in this configuration has the added advantage that it is essentially incompressible. Moreover, a mechanical snorkel like device, or tube, which is filled with an optically transmissive fluid (gas or liquid) may be extended between or otherwise placed in the area between the laser cutter and the structure to be cut. In this manner the laser beam is transmitted through the snorkel or tube to the structure.

A jet of high-pressure gas may be used with the laser cutter and laser beam. The high-pressure gas jet may be used to clear a path, or partial path for the laser beam. The gas may be inert, or it may be air, oxygen, or other type of gas that accelerates the laser cutting. The relatively small amount of oxygen needed, and the rapid rate at which it would be consumed by the burning of the tubular through the laser-metal-oxygen interaction, should not present a fire hazard or risk to the drilling rig, surface equipment, personnel, or subsea components.

The use of oxygen, air, or the use of very high power laser beams, e.g., greater than about 1 kW, could create and maintain a plasma bubble or a gas bubble in the cutting area, which could partially or completely displace the drilling fluid in the path of the laser beam.

A high-pressure laser liquid jet, having a single liquid stream, may be used with the laser cutter and laser beam. The liquid used for the jet should be transmissive, or at least substantially transmissive, to the laser beam. In this type of jet laser beam combination the laser beam may be coaxial with the jet. This configuration, however, has the disadvantage and problem that the fluid jet does not act as a wave-guide. A further disadvantage and problem with this single jet configuration is that the jet must provide both the force to keep the drilling fluid away from the laser beam and be the medium for transmitting the beam.

A compound fluid laser jet may be used as a laser cutter. The compound fluid jet has an inner core jet that is surrounded by annular outer jets. The laser beam is directed by optics into the core jet and transmitted by the core jet, which functions as a waveguide. A single annular jet can surround the core, or a plurality of nested annular jets can be employed. As such, the compound fluid jet has a core jet. This core jet is surrounded by a first annular jet. This first annular jet can also be surrounded by a second annular jet; and the second annular jet can be surrounded by a third annular jet, which can be surrounded by additional annular jets. The outer annular jets function to protect the inner core jet from the drill fluid present in the annulus between the laser cutter and the structure to be cut. The core jet and the first annular jet should be made from fluids that have different indices of refraction. In the situation where the compound jet has only a core and an annular jet surrounding the core the index of refraction of the fluid making up the core should be greater than the index of refraction of the fluid making up the annular jet. In this way, the difference in indices of refraction enable the core of the compound fluid jet to function as a waveguide, keeping the laser beam contained within the core jet and transmitting the laser beam in the core jet. Further, in this configuration the laser beam does not appreciably, if at all, leave the core jet and enter the annular jet.

The pressure and the speed of the various jets that make up the compound fluid jet can vary depending upon the applications and use environment. Thus, by way of example the pressure can range from about 3000 psi, to about 4000 psi to about 30,000 psi, to preferably about 70,000 psi, to greater pressures. The core jet and the annular jet(s) may be the same pressure, or different pressures, the core jet may be higher pressure or the annular jets may be higher pressure. Preferably the core jet is higher pressure than the annular jet. By way of example, in a multi-jet configuration the core jet could be 70,000 psi, the second annular jet (which is positioned adjacent the core and the third annular jet) could be 60,000 psi and the third (outer, which is positioned adjacent the second annular jet and is in contact with the work environment medium) annular jet could be 50,000 psi. The speed of the jets can be the same or different. Thus, the speed of the core jet can be greater than the speed of the annular jet, the speed of the annular jet can be greater than the speed of the core jet and the speeds of multiple annular jets can be different or the same. The speeds of the core jet and the annular jet can be selected, such that the core jet does contact the drilling fluid, or such contact is minimized. The speeds of the jet can range from relatively slow to very fast and preferably range from about 1 ms (meters/second) to about 50 m/s, to about 200 m/s, to about 300 m/s and greater The order in which the jets are first formed can be the core jet first, followed by the annular rings, the annular ring jet first followed by the core, or the core jet and the annular ring being formed simultaneously. To minimize, or eliminate, the interaction of the core with the drilling fluid, the annular jet is created first followed by the core jet.

In selecting the fluids for forming the jets and in determining the amount of the difference in the indices of refraction for the fluids the wavelength of the laser beam and the power of the laser beam are factors that should be considered. Thus, for example for a high power laser beam having a wavelength in the 1080 nm (nanometer) range the core jet can be made from an oil having an index of refraction of about 1.53 and the annular jet can be made from a mixture of oil and water having an index of refraction from about 1.33 to about 1.525. Thus, the core jet for this configuration would have an NA (numerical aperture) from about 0.95 to about 0.12, respectively. Further details, descriptions, and examples of such compound fluid laser jets are contained in Zediker et. al, Provisional U.S. Patent Application, Ser. No. 61/378,910, titled Waveguide Laser Jet and Methods of Use, filed Aug. 31, 2010, the entire disclosure of which is incorporated herein by reference. It is to be noted that said incorporation by reference herein does not provide any right to practice or use the inventions of said application or any patents that may issue therefrom and does not grant, or give rise to, any licenses thereunder.

The angle at which the laser beam contacts the structure to be cut may be determined by the optics within the laser cutter or it may be determined by the angle or positioning of the laser cutter itself. Various angles that are advantageous to or based upon the configuration of the riser, external pipe, coupling or combinations thereof may be utilized.

The number of laser cutters utilized in a configuration of the present inventions can be a single cutter, two cutters, three cutters, and up to and including 12 or more cutters. As discussed above, the number of cutters depends upon several factors and the optimal number of cutters for any particular configuration and end use may be determined based upon the end use requirements and the disclosures and teachings provided in this specification. The cutters may further be positioned such that their respective laser beam paths are parallel, or at least non-intersecting within the center axis of the riser Examples of laser power, fluence and cutting rates, based upon published data, are set forth in Table I.

TABLE I

| type | thickness (mm) | laser power (watts) | spot size (microns) | Laser fluence (MW/cc$^2$) | gas | cutting rate (m/min) |
|---|---|---|---|---|---|---|
| mild steel | 15 | 5,000 | 300 | 7.1 | O$_2$ | 1.8 |
| stainless steel | 15 | 5,000 | 300 | 7.1 | N$_2$ | 1.6 |

The flexible support cables for the laser cutters provide the laser energy and other materials that are needed to perform the cutting operation. Although shown as a single cable for each laser cutter, multiple cables could be used. Thus, for example, in the case of a laser cutter employing a compound fluid laser jet the flexible support cable would include a high power optical fiber, a first line for the core jet fluid and a second line for the annular jet fluid. These lines could be combined into a single cable or they may be kept separate. Additionally, for example, if a laser cutter employing an oxygen jet is utilized, the cutter would need a high power optical fiber and an oxygen line. These lines could be combined into a single cable or they may be kept separate as multiple cables. The lines and optical fibers should be covered in flexible protective coverings or outer sheaths to protect them from riser fluids, the subsea environment, and the movement of the laser cutters, while at the same time remaining flexible enough to accommodate the orbital movement of the laser cutters. As the support cables near the feed-through assembly there to for flexibility decreases and more rigid means to protect them can be employed. For example, the optical fiber may be placed in a metal tube. The conduit that leaves the feet through assembly adds additional protection to the support cables, during assembly of the laser module and the riser, handling of the riser or module, deployment of the riser, and from the subsea environmental conditions.

It is preferable that the feed-through assemblies, the conduits, the support cables, the laser cutters and other subsea components associated with the operation of the laser cutters, should be constructed to meet the pressure requirements for the intended use. The laser cutter related components, if they do not meet the pressure requirements for a particular use, or if redundant protection is desired, may be contained in or enclosed by a structure that does meet the requirements. For deep and ultra-deep water uses the laser cutter related components should preferably be capable of operating under pressures of 2,000 psi, 4,500 psi, 5,000 psi or greater. The materials, fittings, assemblies, useful to meet these pressure requirements are known to those of ordinary skill in the offshore drilling arts, related sub-sea Remote Operated Vehicle ("ROV") art, and in the high power laser art.

The invention may be embodied in other forms than those specifically disclosed herein without departing from its spirit or essential characteristics. The described embodiments are to be considered in all respects only as illustrative and not restrictive.

What is claimed:

1. A laser-riser blowout preventer package for operably releasably associating an offshore drilling rig, a vessel or a platform on a surface of a body the water with a borehole in a seafloor of the body of water, the laser-riser blowout preventer package comprising:
   a. a riser section comprising a first and a second end, wherein the first end has a first coupling and the second end has a second coupling;
   b. a laser module operably associated with the riser section; and,
   c. and a blowout preventer configured to be operably associated with the riser section and the borehole;
   d. wherein, when the laser-riser blowout preventer package is deployed and operably associating the offshore drilling rig with the borehole in the seafloor the offshore drilling rig, vessel or platform is mechanically connected and in fluid communication with the borehole; and, the laser module upon firing a laser beam can completely cut the riser section at a predetermined location on the riser section, thereby releasing the offshore drilling rig, vessel or platform from the blowout preventer.

2. The laser-riser blowout preventer package of claim 1, wherein the first coupling is selected from the group consisting of: a dog connector, a flange-connector, a key connector, a clip connector, a bowen connector, and a threaded connector.

3. The laser-riser blowout preventer package of claim 1, wherein the second coupling is selected from the group consisting of: a dog connector, a flange connector, a key connector, a clip connector, a bowen connector, and a threaded connector.

4. The laser-riser blowout preventer package of claim 1, wherein the second coupling is a blowout preventer connector.

5. The laser-riser blowout preventer package of claim 4, wherein the blowout preventer connector is hydraulic.

6. The laser-riser blowout preventer package of claim 1, wherein the laser module comprises a laser cutter for emitting a laser beam defining a beam path, wherein the beam path is directed toward the first coupling.

7. The laser-riser blowout preventer package of claim 1, wherein the laser module comprises a laser cutter for emitting a laser beam defining a beam path, wherein the beam path is directed toward the second coupling.

8. The laser-riser blowout preventer package of claim 2, wherein the laser module comprises a laser cutter for emitting a laser beam defining a beam path, wherein the beam path is directed toward the first coupling.

9. The laser-riser blowout preventer package of claim 2, wherein the laser module comprises a laser cutter for emitting a laser beam defining a beam path, wherein the beam path is directed toward the second coupling.

10. The laser-riser blowout preventer package of claim 3, wherein the laser module comprises a laser cutter for emitting a laser beam defining a beam path, wherein the beam path is directed toward the first coupling.

11. The laser-riser blowout preventer package of claim 3, wherein the laser module comprises a laser cutter for emitting a laser beam defining a beam path, wherein the beam path is directed toward the second coupling.

12. The laser-riser blowout preventer package of claim 1, wherein the laser module is adjacent the first coupling.

13. The laser-riser blowout preventer package of claim 1, wherein the laser module is adjacent the second coupling.

14. The laser-riser blowout preventer package of claim 1, 2, 4, 6, 7, 8 or 9, wherein the laser module comprises two laser cutters.

15. The laser-riser blowout preventer package of claim 1, comprising 9 additional riser sections.

16. The laser-riser blowout preventer package of claim 1, comprising 29 additional riser sections.

17. The laser-riser blowout preventer package of claim 1, comprising 59 additional riser sections.

18. The laser-riser blowout preventer package of claim 1, comprising 99 additional riser sections.

19. The laser-riser blowout preventer package of claim 2, further comprising 59 additional riser sections.

20. The laser-riser blowout preventer of claim 1, wherein the laser module mechanically engages an exterior of the riser section.

21. A laser-riser blowout preventer package comprising:
   a. A riser section comprising a first riser coupling and a second riser coupling;
   b. A means for providing a laser beam to cut a component of the riser section;
   c. The means for providing a laser beam engaging an exterior of the riser section; and
   d. A blowout preventer;
   e. Whereby the means for providing a laser beam is capable of cutting the riser section from the exterior to release an offshore drilling rig, vessel or platform from the blowout preventer.

22. The laser-riser blowout preventer package of claim 21, wherein the first riser coupling is a dog-style riser coupling.

23. The laser-riser blowout preventer package of claim 22, wherein the second riser coupling is a dog-style riser coupling.

24. The laser-riser blowout preventer package of claim 21, wherein the second riser coupling is a means for connecting the riser section to the blowout preventer.

25. The laser-riser blowout preventer package of claim 24, wherein the means for connecting the riser section to the blowout preventer is hydraulic.

26. The laser-riser blowout preventer package of claim 21, wherein the means for providing a laser beam comprises a laser cutter for emitting a laser beam having a beam path, wherein the beam path is directed toward the first riser coupling.

27. The laser-riser blowout preventer package of claim 21, wherein the means for providing a laser beam comprises a laser cutter for emitting a laser beam having a beam path, wherein the beam path is directed toward the second riser coupling.

28. The laser-riser blowout preventer package of claim 22, wherein the means for providing a laser beam comprises a laser cutter for emitting a laser beam having a beam path, wherein the beam path is directed toward the dog-style riser coupling.

29. The laser-riser blowout preventer package of claim 23, wherein the means for providing a laser beam comprises a laser cutter for emitting a laser beam having a beam path, wherein the beam path is directed toward the dog-style riser coupling.

30. The laser-riser blowout preventer package of claim 24, wherein the means for providing a laser beam comprises a laser cutter for emitting a laser beam having a beam path, wherein the beam path is directed toward the first riser coupling.

31. The laser-riser blowout preventer package of claim 24, wherein the means for providing a laser beam comprises a laser cutter for emitting a laser beam having a beam path, wherein the beam path is directed toward the means for connecting the riser section to the blowout preventer.

32. The laser-riser blowout preventer package of claim 21, wherein the first riser coupling is a flange-style riser coupling.

33. The laser-riser blowout preventer package of claim 32, wherein the second riser coupling is a flange-style riser coupling.

34. The laser-riser blowout preventer package of claim 32, wherein the second riser coupling is a means for connecting the riser section to the blowout preventer.

35. The laser-riser blowout preventer package of claim 34, wherein the means for connecting the riser section to the blowout preventer is hydraulic.

36. The laser-riser blowout preventer package of claim 32, wherein the means for providing a laser beam comprises a laser cutter for emitting a laser beam having a beam path, wherein the beam path is directed toward the flange-style riser coupling.

37. The laser-riser blowout preventer package of claim 32, wherein the means for providing a laser beam comprises a laser cutter for emitting a laser beam having a beam path, wherein the beam path is directed toward the second riser coupling.

38. The laser-riser blowout preventer package of claim 34, wherein the means for providing a laser beam comprises a laser cutter for emitting a laser beam having a beam path, wherein the beam path is directed toward the flange-style riser coupling.

39. The laser-riser blowout preventer package of claim 34, wherein the means for providing a laser beam comprises a laser cutter for emitting a laser beam having a beam path, wherein the beam path is directed toward the means for connecting the riser section to the blowout preventer.

40. The laser-riser blowout preventer package of claim 21, wherein the first riser coupling is a key-style riser coupling.

41. The laser-riser blowout preventer package of claim 40, wherein the second riser coupling is a key-style riser coupling.

42. The laser-riser blowout preventer package of claim 40, wherein the second riser coupling is a means for connecting the riser to the blowout preventer.

43. The laser-riser blowout preventer package of claim 42, wherein the means for connecting the riser section to the blowout preventer is hydraulic.

44. The laser-riser blowout preventer package of claim 40, wherein the means for providing a laser beam comprises a laser cutter for emitting a laser beam having a beam path, wherein the beam path is directed toward the key-style riser coupling.

45. The laser-riser blowout preventer package of claim 40, wherein the means for providing a laser beam comprises a laser cutter for emitting a laser beam having a beam path, wherein the beam path is directed toward the second riser coupling.

46. The laser-riser blowout preventer package of claim 42, wherein the means for providing a laser beam comprises a laser cutter for emitting a laser beam having a beam path, wherein the beam path is directed toward the key-style riser coupling.

47. The laser-riser blowout preventer package of claim 42, wherein the means for providing a laser beam comprises a laser cutter for emitting a laser beam having a beam path, wherein the beam path is directed toward the means for connecting the riser section to the blowout preventer.

48. A laser module for use with a marine riser, the laser module comprising:
   a. A housing configured for mechanical association with a marine riser, the housing defining an inner area, whereby at least a portion of the marine riser is contained within the inner area upon engagement of the housing with the riser;
   b. The housing having a first laser cutter and a second laser cutter;
   c. The first and second laser cutters, being positioned within the housing and the first and second laser cutters each having a laser discharge end;
   d. A first beam path extending from the laser discharge end of the first laser cutter to the inner area of the housing; and
   e. A second beam path extending from the laser discharge end of the second laser cutter to the inner area of the housing;
   f. Wherein the first and second laser cutters are capable of cutting the marine riser.

49. The laser module of claim 48, wherein the inner area of the housing comprises an annulus and wherein the marine riser comprises a center tube, an external pipe, and a coupling, and wherein the annulus is configured to accommodate the center tube, the external pipe and the coupling.

50. The laser module of claim 48, wherein the first beam path is directed to a portion of the inner area, the portion of the inner area being configured for placement adjacent a center tube of the marine riser.

51. The laser module of claim 48, wherein the first beam path is directed to a portion of the inner area, the portion of the inner area being configured for placement adjacent an external pipe of the marine riser.

52. The laser module of claim 48, wherein the first beam path is directed to a portion of the inner area, the portion of the inner area being configured for placement adjacent a coupling of the marine riser.

53. The laser module of claim 48, wherein the first and second laser cutters are configured within the housing to move within the housing, whereby the first and second laser cutters have the ability to at least partially orbit around the marine riser when the housing is engaged with the marine riser.

54. The laser module of claim 48, wherein the marine riser comprises a coupling comprising a flange, a bolt and a nut.

55. The laser module of claim 54, wherein the first beam path is directed to a portion of the inner area of the housing, which portion is configured for placement adjacent the bolt.

56. The laser module of claim 54, wherein the first beam path is directed to a portion of the inner area of the housing, which portion is configured for placement adjacent the nut.

57. The laser module of claim 54, wherein the first beam path is directed to a portion of the inner area of the housing, the portion of the inner area being configured for placement adjacent the flange.

58. The laser module of claim 48, wherein the marine riser comprises a coupling comprising a shoulder.

59. The laser module of claim 58, wherein the first beam path is directed to a portion of the inner area of the housing, the portion of the inner area being configured for placement adjacent the shoulder.

60. A quick release riser section comprising:
   a. A riser section, comprising a first end having a first coupling, a second end having a second coupling and a center tube;
   b. A laser cutter engaging an exterior of the riser section; and,
   c. A beam path extending between the laser cutter and the riser section; whereby the laser cutter is capable of cutting the riser section from the exterior to release an offshore drilling rig, vessel or platform from a blowout preventer.

61. The quick release riser section of claim 60, wherein the center tube has a central region located between the first and second ends, and wherein the beam path intersects the central region.

62. The quick release riser section of claim 60, wherein the beam path intersects the first coupling.

63. The quick release riser section of claim 60, wherein the first coupling comprises a key and the beam path is directed toward the key.

64. The quick release riser section of claim 60, wherein the first coupling comprises a flange and the beam path intersects the flange.

65. The quick release riser section of claim 60, wherein the first coupling comprises a bolt and the beam path intersects the bolt.

66. The quick release riser section of claim 60, wherein the first coupling comprises a nut and the beam path intersects the nut.

67. An offshore drilling rig system comprising:
   an offshore drilling rig; and
   a quick release riser blowout preventer package, the package comprising:
   a. a riser comprising a plurality of riser sections, wherein the plurality of riser sections are configured for being lowered from the offshore drilling rig to a depth at or near a seafloor; and mechanically connected to the offshore drilling rig; and in fluid communication with the offshore drilling rig;
   b. a blowout preventer, the blowout preventer configured for being mechanically connected to the riser; in fluid communication with the riser; and lowered by the riser from the offshore drilling rig to the seafloor; and,
   c. the riser comprising a laser module; and,
   d. the laser module comprising a laser cutter for emitting a laser beam defining a beam path, wherein the beam path is directed from the laser cutter toward one of the plurality of riser sections;
   e. wherein, when the package is deployed and mechanically connecting the offshore drilling rig with a borehole in the seafloor, the laser module upon firing a laser beam can cut at least a portion of the one of the plurality of riser sections at a predetermined location, thereby providing for the quick release of the offshore drilling rig from the blowout preventer.

68. A method of drilling subsea wells by using a laser module operably associated with a riser section, the method comprising:
   a. lowering a blowout preventer from an offshore drilling rig to a seafloor using a riser comprising a plurality of riser sections, wherein the blowout preventer comprises a blowout preventer cavity defined by the blowout preventer, the riser comprises a riser cavity defined by the riser;
   b. one of the plurality of riser sections having a laser module operably associated therewith, wherein the laser module comprises a laser cutter for emitting a laser beam that defines a beam path and wherein the beam path is directed from the laser cutter toward a component of the one of the plurality of riser sections;
   c. securing the blowout preventer to a borehole defining a borehole cavity, whereby the borehole cavity, the blowout preventer cavity and the riser cavity are in fluid and mechanical communication; and,
   d. advancing the borehole by lowering tubulars from the offshore drilling rig down through the riser cavity, the blowout preventer cavity and into the borehole;
   e. whereby, a drilling operation is enhanced by having an ability in an emergency situation to fire a laser beam from the laser module to completely cut the component of the one of the plurality of riser sections in the beam path, thereby weakening the riser.

69. A method of performing drilling, workover, intervention, completion or service activities on a subsea well by using a laser module, the method comprising:
   a. positioning a riser between a surface of a body of water and a seafloor, the riser comprising a riser cavity defined by the riser, wherein the riser is in fluid communication with a subsea well and an offshore rig, vessel or platform;
   b. mechanically associating a laser module with the riser, wherein the laser module comprises a laser cutter for emitting a laser beam that defines a beam path and wherein the beam path is directed from the laser cutter toward a component of the riser; and,
   c. performing activities on the well by moving a structure through the riser cavity;
   d. providing the capability to fire a laser beam from the laser module to completely cut the riser in the beam path, thereby weakening the riser and providing a controlled disconnection of the riser.

70. The method of claim 69, wherein the structure is selected from the group consisting of a tubular, a tool and a drill pipe.

* * * * *